US012684309B2

(12) United States Patent
Kawczinski et al.

(10) Patent No.: US 12,684,309 B2
(45) Date of Patent: Jul. 14, 2026

(54) RENDERING BASED ON LOUDSPEAKER ORIENTATION

(71) Applicant: Dolby Laboratories Licensing Corporation, San Francisco, CA (US)

(72) Inventors: Kimberly Jean Kawczinski, San Francisco, CA (US); Alan Jeffrey Seefeldt, Alameda, CA (US); Timothy Alan Port, Drummoyne (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 145 days.

(21) Appl. No.: 18/706,635

(22) PCT Filed: Nov. 7, 2022

(86) PCT No.: PCT/US2022/049170
§ 371 (c)(1),
(2) Date: May 1, 2024

(87) PCT Pub. No.: WO2023/086303
PCT Pub. Date: May 19, 2023

(65) Prior Publication Data

US 2024/0422503 A1 Dec. 19, 2024

Related U.S. Application Data

(60) Provisional application No. 63/364,322, filed on May 6, 2022, provisional application No. 63/277,225, filed on Nov. 9, 2021.

(30) Foreign Application Priority Data

May 10, 2022 (EP) .................................... 22172447

(51) Int. Cl.
*H04S 7/00* (2006.01)
*H04R 5/04* (2006.01)

(52) U.S. Cl.
CPC ................ *H04S 7/40* (2013.01); *H04R 5/04* (2013.01); *H04S 7/302* (2013.01)

(58) Field of Classification Search
CPC .............. H04S 7/302; H04S 7/40; H04R 5/04
See application file for complete search history.

(56) References Cited

U.S. PATENT DOCUMENTS 9,485,556 B1 * 11/2016 List .......................... H04S 3/002
9,712,939 B2 7/2017 Mateos Sole
(Continued)

FOREIGN PATENT DOCUMENTS

EP 3223542 A2 9/2017
JP 2005057545 A 3/2005
(Continued)

OTHER PUBLICATIONS

Hess, "Head-Tracking Techniques for Virtual Acoustic Applications," (AES 133rd Convention, Oct. 2012), 15 pages.
(Continued)

*Primary Examiner* — Paul W Huber

(57) ABSTRACT

An audio processing method may involve receiving audio signals and associated spatial data, listener position data, loudspeaker position data and loudspeaker orientation data, and rendering the audio data for reproduction, based, at least in part, on the spatial data, the listener position data, the loudspeaker position data and the loudspeaker orientation data, to produce rendered audio signals. The rendering may involve applying a loudspeaker orientation factor that tends to reduce a relative activation of a loudspeaker based, at least in part, on an increased loudspeaker orientation angle. In some examples, the rendering may involve modifying an effect of the loudspeaker orientation factor based, at least in part, on a loudspeaker importance metric. The loudspeaker importance metric may correspond to a loudspeaker's
(Continued)

importance for rendering an audio signal at the audio signal's intended perceived spatial position.

16 Claims, 19 Drawing Sheets

(56) References Cited

U.S. PATENT DOCUMENTS

| | | | | |
|---|---|---|---|---|
| 9,774,976 | B1 | 9/2017 | Baumgarte | |
| 9,781,513 | B2 | 10/2017 | Ramos | |
| 9,900,723 | B1 | 2/2018 | Choisel | |
| 9,942,686 | B1 | 4/2018 | Family | |
| 9,949,052 | B2 | 4/2018 | Wang | |
| 10,306,364 | B2 | 5/2019 | Sheen | |
| 10,327,067 | B2 | 6/2019 | Chang | |
| 10,779,084 | B2 | 9/2020 | Arteaga | |
| 10,945,090 | B1 * | 3/2021 | Choisel | H04S 7/303 |
| 11,032,646 | B2 * | 6/2021 | Walther | H04R 3/12 |
| 11,039,266 | B1 | 6/2021 | Holman | |
| 11,070,909 | B2 | 7/2021 | Zheng | |
| 11,109,178 | B2 | 8/2021 | Terentiv | |
| 11,146,905 | B2 | 10/2021 | Thall | |
| 11,172,318 | B2 | 11/2021 | Seefeldt | |
| 2018/0295461 | A1 * | 10/2018 | Di Censo | H04S 7/303 |
| 2018/0367939 | A1 * | 12/2018 | Fischer | H04S 7/305 |
| 2021/0168552 | A1 * | 6/2021 | Walther | H04S 7/302 |
| 2021/0296769 | A1 * | 9/2021 | Kallai | G06F 3/162 |

FOREIGN PATENT DOCUMENTS

| | | | |
|---|---|---|---|
| WO | 2020021375 | A1 | 1/2020 |
| WO | 2020030304 | A1 | 2/2020 |
| WO | 2021021682 | A1 | 2/2021 |
| WO | 2021127286 | A1 | 6/2021 |
| WO | 2022119990 | A1 | 6/2022 |
| WO | 2022120005 | A1 | 6/2022 |

OTHER PUBLICATIONS

Mardeni et al., "Node Positioning in ZigBee Network Using Trilateration Method Based on the Received Signal Strength Indicator (RSSI)" 2010, 46, 15 pages.

Shi et al., "Spatial Calibration of Surround Sound Systems including Listener Position Estimation," (AES 137th Convention, Oct. 2014), 7 pages.

Sun, "Immersive Audio, Capture, Transport, and Rendering: A Review," SIP, vol. 10, e13, pp. 1-24, Cambridge University Press, Aug. 2021, 24 pages.

Yang et al., "Indoor Localization Using Improved RSS-Based Lateration Methods," Globecom 2009—2009 IEEE Global Telecommunications Conference, Honolulu, HI, 2009, pp. 1-6, doi: 10.1109/Glocom.2009.5425237, 7 pages.

* cited by examiner 1020a
1015a
1025b
1010a
1025a $$x = 0.5 \cdot \left\{ \frac{\tan^{-1}\left[\left(\frac{|\theta| - T_\theta}{\pi - T_\theta}\right) \cdot 2r - r\right]}{\tan^{-1}(r)} + 1 \right\} \quad (6)$$

1025d

Figure 10

1020b
1015b
1010b
1025c $$y = \frac{\tan^{-1}\left[\left(1 - \frac{\alpha}{T_\alpha}\right) \cdot 2r - \frac{r}{2}\right] - \tan^{-1}\left(-r + \frac{r}{2}\right)}{\tan^{-1}\left(r + \frac{r}{2}\right) - \tan^{-1}\left(-r + \frac{r}{2}\right)} \quad (7)$$

1025d

Figure 11

RENDERING BASED ON LOUDSPEAKER ORIENTATION

CROSS-REFERENCE TO RELATED APPLICATIONS

This application is a U.S. National Stage application under U.S.C. 371 of International Application No. PCT/US2022/049170, filed on Nov. 7, 2022, which claims priority to U.S. provisional application 63/277,225, filed Nov. 9, 2021, U.S. provisional application 63/364,322, filed May 6, 2022, and EP application 22/172,447.9, filed May 10, 2022, each application of which is incorporated herein by reference in its entirety.

This application claims priority to U.S. provisional application 63/277,225, filed Nov. 9, 2021, U.S. provisional application 63/364,322, filed May 6, 2022, and EP application 22172447.9, filed May 10, 2022, each application of which is incorporated herein by reference in its entirety.

TECHNICAL FIELD

The present disclosure pertains to devices, systems and methods for rendering audio data for playback on audio devices.

BACKGROUND

Audio devices, including but not limited to smart audio devices, have been widely deployed and are becoming common features of many homes. Although existing systems and methods for controlling audio devices provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more audio processing methods. In some instances, the method(s) may be implemented, at least in part, by a control system and/or via instructions (e.g., software) stored on one or more non-transitory media. Some such methods may involve receiving, by a control system and via an interface system, audio data, the audio data including one or more audio signals and associated spatial data. The spatial data may indicate an intended perceived spatial position corresponding to an audio signal of the one or more audio signals. The intended perceived spatial position may, for example, correspond to a channel of a channel-based audio format. Alternatively, or additionally, the intended perceived spatial position may correspond to positional metadata, for example, to positional metadata of an object-based audio format.

In some examples, the method may involve receiving, by the control system and via the interface system, listener position data indicating a listener position corresponding to a person in an audio environment. According to some examples, the method may involve receiving, by the control system and via the interface system, loudspeaker position data indicating a position of each loudspeaker of a plurality of loudspeakers in the audio environment. In some examples, the method may involve receiving, by the control system and via the interface system, loudspeaker orientation data. In some such examples, the loudspeaker orientation data may indicate a loudspeaker orientation angle between (a) a direction of maximum acoustic radiation for each loudspeaker of the plurality of loudspeakers in the audio environment; and (b) the listener position. In some such examples, listener position may be relative to a position of a corresponding loudspeaker. According to some examples, the loudspeaker orientation angle for a particular loudspeaker may be an angle between (a) the direction of maximum acoustic radiation for the particular loudspeaker and (b) a line between a position of the particular loudspeaker and the listener position.

According to some examples, the method may involve rendering, by the control system, the audio data for reproduction via at least a subset of the plurality of loudspeakers in the audio environment, to produce rendered audio signals. In some examples, the rendering may be based, at least in part, on the spatial data, the listener position data, the loudspeaker position data and the loudspeaker orientation data. In some examples, the rendering may involve applying a loudspeaker orientation factor that tends to reduce a relative activation of a loudspeaker based, at least in part, on an increased loudspeaker orientation angle.

In some examples, the method may involve providing, via the interface system, the rendered audio signals to at least the subset of the loudspeakers of the plurality of loudspeakers in the audio environment.

According to some examples, the method may involve estimating a loudspeaker importance metric for at least the subset of the loudspeakers. For example, the method may involve estimating a loudspeaker importance metric for each loudspeaker of the subset of the loudspeakers. In some examples, the loudspeaker importance metric may correspond to a loudspeaker's importance for rendering an audio signal at the audio signal's intended perceived spatial position. According to some examples, the rendering for each loudspeaker may be based, at least in part, on the loudspeaker importance metric. In some examples, the rendering for each loudspeaker may involve modifying an effect of the loudspeaker orientation factor based, at least in part, on the loudspeaker importance metric. According to some examples, the rendering for each loudspeaker may involve reducing an effect of the loudspeaker orientation factor based, at least in part, on an increased loudspeaker importance metric.

In some examples, the method may involve determining whether a loudspeaker orientation angle equals or exceeds a threshold loudspeaker orientation angle. According to some examples, the audio processing method may involve applying the loudspeaker orientation factor only if the loudspeaker orientation angle equals or exceeds the threshold loudspeaker orientation angle. In some examples, the loudspeaker importance metric may be based, at least in part, on a distance between an eligible loudspeaker and a line between (a) a first loudspeaker having a shortest clockwise angular distance from the eligible loudspeaker and (b) a second loudspeaker having a shortest counterclockwise angular distance from the eligible loudspeaker. In some such examples, an eligible loudspeaker may be a loudspeaker having a loudspeaker orientation angle that equals or exceeds the threshold loudspeaker orientation angle. In some instances, the first loudspeaker and the second loudspeaker may be ineligible loudspeakers having loudspeaker orientation angles that are less than the threshold loudspeaker orientation angle.

According to some examples, the rendering may involve determining relative activations for at least the subset of the loudspeakers by optimizing a cost that is a function of: a model of perceived spatial position of an audio signal of the one or more audio signals when played back over the subset of loudspeakers in the audio environment; a measure of proximity of the intended perceived spatial position of the audio signal to a position of each loudspeaker of the subset of loudspeakers; and one or more additional dynamically configurable functions. In some such examples, at least one of the one or more additional dynamically configurable functions may be based, at least in part, on the loudspeaker orientation factor. According to some such examples, at least one of the one or more additional dynamically configurable functions may be based, at least in part, on the loudspeaker importance metric. In some such examples, at least one of the one or more additional dynamically configurable functions may be based, at least in part, on a measurement or estimate of acoustic transmission from each loudspeaker in the audio environment to other loudspeakers in the audio environment.

Aspects of some disclosed implementations include a control system configured (e.g., programmed) to perform one or more disclosed methods or steps thereof, and a tangible, non-transitory, computer readable medium which implements non-transitory storage of data (for example, a disc or other tangible storage medium) which stores code for performing (e.g., code executable to perform) one or more disclosed methods or steps thereof. For example, some disclosed embodiments can be or include a programmable general purpose processor, digital signal processor, or microprocessor, programmed with software or firmware and/or otherwise configured to perform any of a variety of operations on data, including one or more disclosed methods or steps thereof. Such a general purpose processor may be or include a computer system including an input device, a memory, and a processing subsystem that is programmed (and/or otherwise configured) to perform one or more disclosed methods (or steps thereof) in response to data asserted thereto.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 10 and 11 show equations 6 and 7 of this disclosure, respectively, with elements of each equation identified.

DETAILED DESCRIPTION

Figure 1:
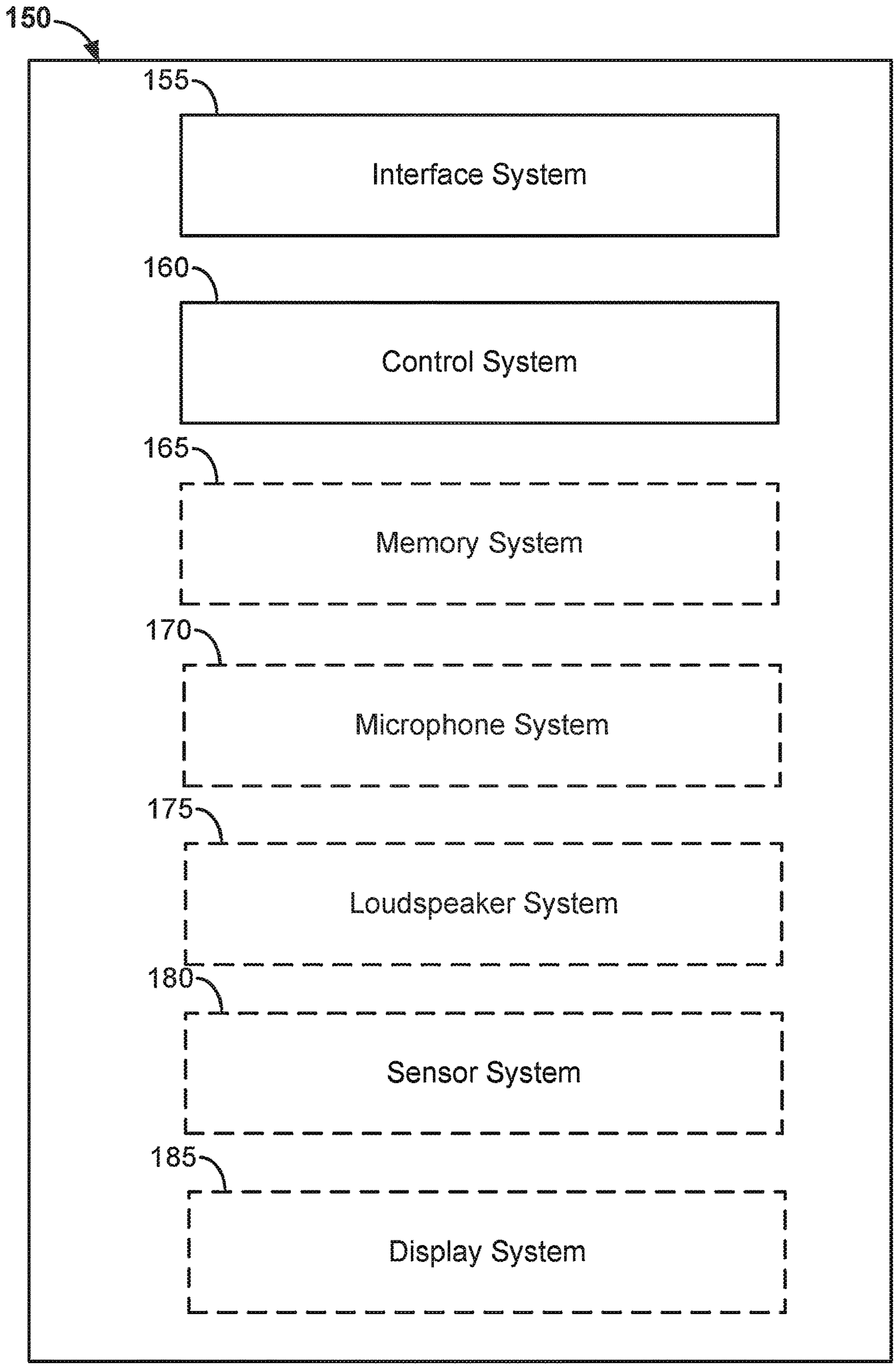
FIG. 1 is a block diagram that shows examples of components of an apparatus capable of implementing various aspects of this disclosure.

Playback of spatial audio in a consumer environment has typically been tied to a prescribed number of loudspeakers placed in prescribed positions. Some examples include Dolby 5.1 and Dolby 7.1 surround sound. More recently, immersive, object-based spatial audio formats have been introduced, such as Dolby Atmos™, which break this association between the audio content and specific loudspeaker locations. Instead, the content may be described as a collection of individual audio objects, each of which may have associated time-varying metadata, such as positional metadata for describing the desired perceived location of said audio objects in three-dimensional space. At playback time, the content is transformed into loudspeaker feeds by a renderer which adapts to the number and location of loudspeakers in the playback system. Many such renderers, however, still constrain the locations of the set of loudspeakers to be one of a set of prescribed layouts (for example Dolby 3.1.2, Dolby 5.1.2, Dolby 7.1.4, Dolby 9.1.6, etc., with Dolby Atmos).

"Flexible rendering" methods have recently been developed that allow object-based audio—as well as legacy channel-based audio—to be rendered flexibly over an arbitrary number of loudspeakers placed at arbitrary positions. These methods generally require that the renderer have knowledge of the number and physical locations of the loudspeakers in the listening space. For such a system to be practical for the average consumer, an automated method for locating the loudspeakers is desirable. Accordingly, methods for automatically locating the positions of loudspeakers within a listening space, which may also be referred to herein as an "audio environment," have recently been developed. Detailed examples of flexible rendering and automatic audio device location are provided herein.

Simultaneous to the introduction of object-based spatial audio in the consumer space has been the rapid adoption of so-called "smart speakers", such as the Amazon Echo™ line of products. The tremendous popularity of these devices can be attributed to their simplicity and convenience afforded by wireless connectivity and an integrated voice interface (Amazon's Alexa™, for example), but the sonic capabilities of these devices has generally been limited, particularly with respect to spatial audio. In most cases these devices are constrained to mono or stereo playback. However, combining the aforementioned flexible rendering and auto-location technologies with a plurality of orchestrated smart speakers may yield a system with very sophisticated spatial playback capabilities and that still remains extremely simple for the consumer to set up. A consumer can place as many or few of the speakers as desired, wherever is convenient, without the need to run speaker wires due to the wireless connectivity, and the built-in microphones can be used to automatically locate the speakers for the associated flexible renderer.

The above-described flexible rendering methods take into account the locations of loudspeakers with respect to a listening position or area, but they do not take into account the orientation of the loudspeakers with respect to the listening position or area. In general, these methods model speakers as radiating directly toward the listening position, but in reality this may not be the case. The more that a loudspeaker's orientation points away from the intended listening position, the more that several acoustic properties may change, with two being most notable. First, the overall equalization heard at the listening position may change, with high frequencies usually falling off due to most loudspeakers exhibiting higher degrees of directivity at higher frequencies. Second, the ratio of direct to reflected sound at the listening position may decrease as more acoustic energy is directed away from the listening position and interacts with the room before eventually being heard.

In view of the potential effects of loudspeaker orientation, some disclosed implementations may involve one or more of the following:

- For any given location of a loudspeaker, the activation of a loudspeaker may be reduced as the orientation of the loudspeaker increases away from the listening position; and
- The degree of the above reduction may be reduced as a function of a measure of the loudspeaker's importance for rendering any audio signal at its desired perceived spatial position.

Detailed Examples are Described Below

FIG. 1 is a block diagram that shows examples of components of an apparatus capable of implementing various aspects of this disclosure. As with other figures provided herein, the types and numbers of elements shown in FIG. 1 are merely provided by way of example. Other implementations may include more, fewer and/or different types and numbers of elements. According to some examples, the apparatus 150 may be configured for performing at least some of the methods disclosed herein. In some implementations, the apparatus 150 may be, or may include, one or more components of an audio system. For example, the apparatus 150 may be an audio device, such as a smart audio device, in some implementations. In other examples, the examples, the apparatus 150 may be a mobile device (such as a cellular telephone), a laptop computer, a tablet device, a television, a vehicle or a component thereof, or another type of device.

According to some alternative implementations the apparatus 150 may be, or may include, a server. In some such examples, the apparatus 150 may be, or may include, an encoder. Accordingly, in some instances the apparatus 150 may be a device that is configured for use within an audio environment, whereas in other instances the apparatus 150 may be a device that is configured for use in "the cloud," e.g., a server.

In this example, the apparatus 150 includes an interface system 155 and a control system 160. The interface system 155 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 155 may, in some implementations, be configured for exchanging control information and associated data with audio devices of the audio environment. The control information and associated data may, in some examples, pertain to one or more software applications that the apparatus 150 is executing.

The interface system 155 may, in some implementations, be configured for receiving, for providing, or for both for receiving and providing, a content stream. The content stream may include audio data. The audio data may include, but may not be limited to, audio signals. In some instances, the audio data may include spatial data, such as channel data and/or spatial metadata. Metadata may, for example, have been provided by what may be referred to herein as an "encoder." In some examples, the content stream may include video data and audio data corresponding to the video data.

The interface system 155 may include one or more network interfaces and/or one or more external device interfaces (such as one or more universal serial bus (USB) interfaces). According to some implementations, the interface system 155 may include one or more wireless interfaces. The interface system 155 may include one or more devices for implementing a user interface, such as one or more microphones, one or more loudspeakers, a display system, a touch sensor system and/or a gesture sensor system. In some examples, the interface system 155 may include one or more interfaces between the control system 160 and a memory system, such as the optional memory system 165 shown in FIG. 1. However, the control system 160 may include a memory system in some instances. The interface system 155 may, in some implementations, be configured for receiving input from one or more microphones in an environment.

The control system 160 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 160 may reside in more than one device. For example, in some implementations a portion of the control system 160 may reside in a device within one of the environments depicted herein and another portion of the control system 160 may reside in a device that is outside the environment, such as a server, a mobile device (e.g., a smartphone or a tablet computer), etc. In other examples, a portion of the control system 160 may reside in a device within one of the environments depicted herein and another portion of the control system 160 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 160 may reside in a device that is implementing a cloud-based service, such as a server, and another portion of the control system 160 may reside in another device that is implementing the cloud-based service, such as another server, a memory device, etc. The interface system 155 also may, in some examples, reside in more than one device.

In some implementations, the control system 160 may be configured for performing, at least in part, the methods disclosed herein. According to some examples, the control system 160 may be configured to receive, via the interface system 155, audio data, listener position data, loudspeaker position data and loudspeaker orientation data. The audio data may include one or more audio signals and associated spatial data indicating an intended perceived spatial position corresponding to an audio signal. The listener position data may indicate a listener position corresponding to a person in an audio environment. The loudspeaker position data may indicate a position of each loudspeaker of a plurality of loudspeakers in the audio environment. The loudspeaker orientation data may indicate a loudspeaker orientation angle between (a) a direction of maximum acoustic radiation for each loudspeaker of the plurality of loudspeakers in the audio environment; and (b) the listener position, relative to a corresponding loudspeaker.

In some such examples, the control system 160 may be configured to render the audio data for reproduction via at least a subset of the plurality of loudspeakers in the audio environment, to produce rendered audio signals. According to some such examples, the rendering may be based, at least in part, on the spatial data, the listener position data, the loudspeaker position data and the loudspeaker orientation data. In some such examples, the rendering may involve applying a loudspeaker orientation factor that tends to reduce a relative activation of a loudspeaker based, at least in part, on an increased loudspeaker orientation angle.

In some examples, the control system 160 may be configured to estimate a loudspeaker importance metric for at least the subset of the loudspeakers. The loudspeaker importance metric may correspond to a loudspeaker's importance for rendering an audio signal at the audio signal's intended perceived spatial position. In some such examples, the rendering for each loudspeaker may be based, at least in part, on the loudspeaker importance metric.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 165 shown in FIG. 1 and/or in the control system 160. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 160 of FIG. 1.

In some examples, the apparatus 150 may include the optional microphone system 170 shown in FIG. 1. The optional microphone system 170 may include one or more microphones. According to some examples, the optional microphone system 170 may include an array of microphones. In some examples, the control system 160 may be configured to determine direction of arrival (DOA) and/or time of arrival (TOA) information, e.g., according to signals from the array of microphones. The array of microphones may, in some instances, be configured for receive-side beamforming, e.g., according to instructions from the control system 160. In some implementations, one or more of the microphones may be part of, or associated with, another device, such as a speaker of the speaker system, a smart audio device, etc. In some examples, the apparatus 150 may not include a microphone system 170. However, in some such implementations the apparatus 150 may nonetheless be configured to receive microphone data for one or more microphones in an audio environment via the interface system 160. In some such implementations, a cloud-based implementation of the apparatus 150 may be configured to receive microphone data, or data corresponding to the microphone data, from one or more microphones in an audio environment via the interface system 160.

According to some implementations, the apparatus 150 may include the optional loudspeaker system 175 shown in FIG. 1. The optional loudspeaker system 175 may include one or more loudspeakers, which also may be referred to herein as "speakers" or, more generally, as "audio reproduction transducers." In some examples (e.g., cloud-based implementations), the apparatus 150 may not include a loudspeaker system 175.

In some implementations, the apparatus 150 may include the optional sensor system 180 shown in FIG. 1. The optional sensor system 180 may include one or more touch sensors, gesture sensors, motion detectors, etc. According to some implementations, the optional sensor system 180 may include one or more cameras. In some implementations, the cameras may be free-standing cameras. In some examples, one or more cameras of the optional sensor system 180 may reside in a smart audio device, which may in some examples be configured to implement, at least in part, a virtual assistant. In some such examples, one or more cameras of the optional sensor system 180 may reside in a television, a mobile phone or a smart speaker. In some examples, the apparatus 150 may not include a sensor system 180. However, in some such implementations the apparatus 150 may nonetheless be configured to receive sensor data for one or more sensors in an audio environment via the interface system 160.

In some implementations, the apparatus 150 may include the optional display system 185 shown in FIG. 1. The optional display system 185 may include one or more displays, such as one or more light-emitting diode (LED) displays. In some instances, the optional display system 185 may include one or more organic light-emitting diode (OLED) displays. In some examples, the optional display system 185 may include one or more displays of a smart audio device. In other examples, the optional display system 185 may include a television display, a laptop display, a mobile device display, or another type of display. In some examples wherein the apparatus 150 includes the display system 185, the sensor system 180 may include a touch sensor system and/or a gesture sensor system proximate one or more displays of the display system 185. According to some such implementations, the control system 160 may be configured for controlling the display system 185 to present one or more graphical user interfaces (GUIs).

According to some such examples the apparatus 150 may be, or may include, a smart audio device. In some such implementations the apparatus 150 may be, or may include, a wakeword detector. For example, the apparatus 150 may be, or may include, a virtual assistant.

Previously-implemented flexible rendering methods mentioned earlier take into account the locations of loudspeakers with respect to a listening position or area, but they do not take into account the orientation of the loudspeakers with respect to the listening position or area. In general, these methods model speakers as radiating directly toward the listening position, but in reality this may not be the case. Associated with most loudspeakers is a direction along which acoustic energy is maximally radiated, and ideally this direction is pointed at the listening position or area. For a simple device with a single loudspeaker driver mounted in an enclosure, the side of the enclosure in which the loudspeaker is mounted would be considered the "front" of the device, and ideally the device is oriented such that this front is facing the listening position or area. More complex devices may contain multiple individually-addressable loudspeakers pointing in different directions with respect to the device. In such cases, the orientation of each individual loudspeaker with respect to the listening position or area may be considered when the overall orientation of the device with respect to the listening position or area is set. Additionally, devices may contain speakers with nonzero elevation (for example, oriented upward from the device); the orientation of these speakers with respect to the listening position may simply be considered in three dimensions rather than two.

Figure 2:
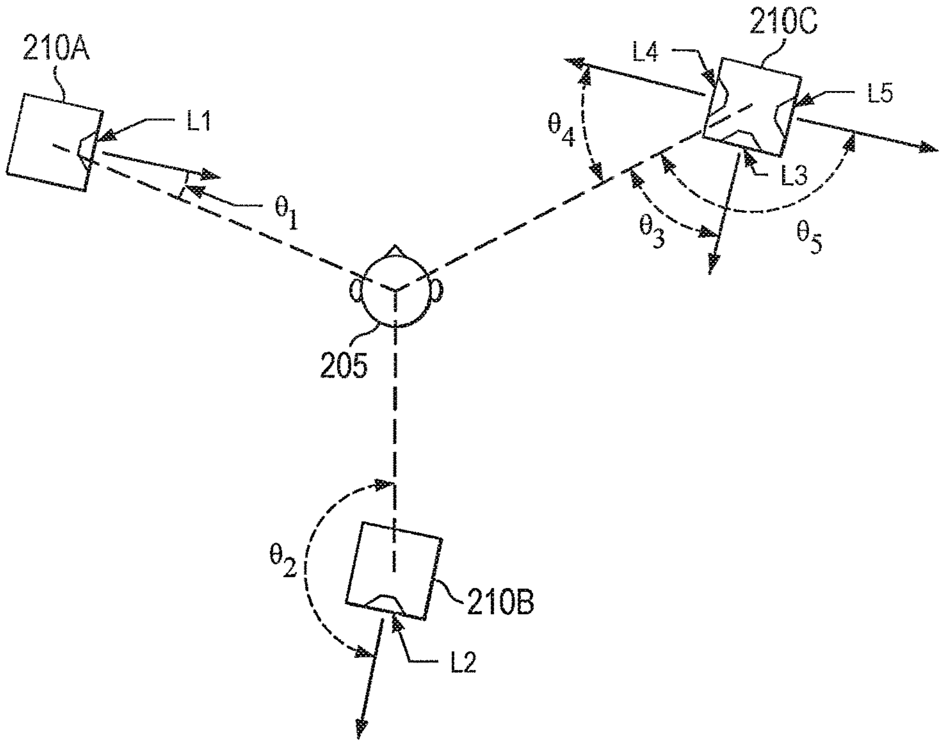
FIG. 2 shows an example of an audio environment.

FIG. 2 shows an example of an audio environment. FIG. 2 depicts examples of loudspeaker orientation with respect to a listening position or area. FIG. 2 represents an overhead view of an audio environment, with the listening position represented by the head of the listener 205. As with other figures provided herein, the types, numbers and arrangement of elements shown in FIG. 2 are merely provided by way of example. Other implementations may include more, fewer and/or different types and numbers of elements, differently arranged elements, etc.

According to this example, the audio environment 200 includes audio devices 210A, 210B and 210C. The audio devices 210A-210C may, in some examples, be instances of the apparatus 150 of FIG. 1. In this example, audio device 210A includes a single loudspeaker L1 and audio device 210B includes a single loudspeaker L2, while audio device 210C contains three individual loudspeakers, L3, L4, and L5. The arrows pointing out of each loudspeaker represent the direction of maximum acoustic radiation associated with each. For audio devices 210A and 210B, each containing a single loudspeaker, these arrows can be viewed as the "front" of the device. For audio device 210C, loudspeakers L3, L4, and L5 may be considered to be front, left and right speakers, respectively. As such, the arrow associated with L3 may be viewed as the front of audio device 210C.

The orientation of each loudspeaker may be represented in various ways, depending on the particular implementation. In this example, the orientation of each loudspeaker is represented by the angle between the loudspeaker's direction of maximum radiation and the line connecting its associated device to the listening position. This orientation angle may vary between −180 and 180 degrees, with 0 degrees indicating that a loudspeaker is pointed directly at the listening position and −180 or 180 degrees indicating that a loudspeaker is pointed completely away from the listening position. The orientation angle of L1, represented by the value $q_1$ in the figure, is close to zero, indicating that loudspeaker L1 is oriented almost directly at the listening position. On the other hand, $q_2$ is close to 180 degrees, meaning that loudspeaker L2 is oriented almost directly away from the listening position. In audio device 210C, $q_3$ and $q_4$ have relatively small values, with absolute values less than 90 degrees, indicating the L3 and L4 are oriented substantially toward the listening position. However, $q_5$ has a relatively large value, with an absolute value greater than 90 degrees, indicating that L5 is oriented substantially away from the listening position. The positions and orientations of a set of loudspeakers may be determined, or at least estimated, according to various techniques, including but not limited to those disclosed herein.

As noted above, the more that a loudspeaker's orientation points away from the intended listening position, the more that several acoustic properties may change, with two acoustic properties being most prominent. First, the overall equalization heard at the listening position may change, with high frequencies usually decreasing because most loudspeakers have higher degrees of directivity at higher frequencies. Second, the ratio of direct to reflected sound at the listening position may decrease, because relatively more acoustic energy is directed away from the listening position and interacts with walls, floors, objects, etc., in the audio environment before eventually being heard. The first issue can often be mitigated to a certain degree with equalization, but the second issue cannot.

When a loudspeaker that points away from the intended listening position is combined with others for the purposes of spatial reproduction, this second issue can be particularly problematic. Imaging of the elements of a spatial mix at their desired locations is generally best achieved when the loudspeakers contributing to this imaging all have a relatively high direct-to-reflected ratio at the listening position. If a particular loudspeaker does not because the loudspeaker is oriented away from the listening position, then the imaging may become inaccurate or "blurry". In some examples, it may be beneficial to exclude this loudspeaker from the rendering process to improve imaging. However, in some instances, excluding such a loudspeaker from the rendering process may cause even larger impairments to the overall spatial rendering than including the loudspeaker in the rendering process. For example, if a loudspeaker is pointing away from the listening position, but it is the only loudspeaker to the left of the listening position, it may be better to keep this loudspeaker as part of the rendering rather than having the entire spatial mix collapse towards the right of the listening position due to its exclusion.

Some disclosed examples involve navigating such choices for a rendering system in which both the locations and orientations of loudspeakers are specified with respect to the listening position. For example, some disclosed examples involve rendering a set of one or more audio signals, each audio signal having an associated desired perceived spatial position, over a set of two or more loudspeakers. In some such examples, the location and orientation of each loudspeaker of a set of loudspeakers (for example, relative to a desired listening position or area) are provided to the renderer. According to some such examples, the relative activations of each loudspeaker may be computed as a function of the desired perceived spatial positions of the one or more audio signals and the locations and orientations of the loudspeakers. In some such examples, for any given location of a loudspeaker, the activation of a loudspeaker may be reduced as the orientation of the loudspeaker increases away from the listening position. According to some such examples, the degree of this reduction may itself be reduced as a function of a measure of the loudspeaker's importance for rendering any audio signal at its desired perceived spatial position.

Figure 3:
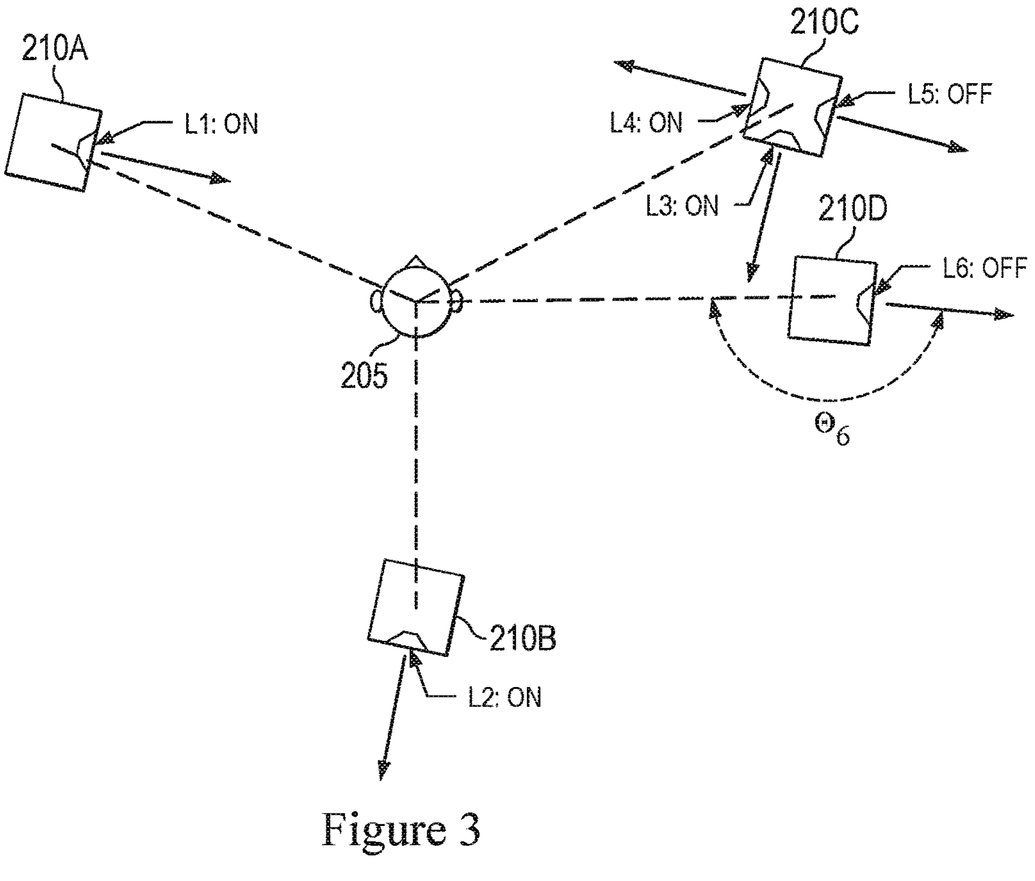
FIG. 3 shows another example of an audio environment.

FIG. 3 shows another example of an audio environment. According to this example, the audio environment 200 includes audio devices 210A, 210B and 210C of FIG. 2, as well as an additional audio device 210D. The audio device 210D may, in some examples, be an instance of the apparatus 150 of FIG. 1. In this example, audio device 210D includes a single loudspeaker L6. The arrow pointing out of the loudspeaker L6 represents the direction of maximum acoustic radiation associated with the loudspeaker L6, and indicates that $q_6$ is close to 180 degrees, meaning that loudspeaker L6 is oriented almost directly away from the listening position corresponding to the listener 205.

FIG. 3 also shows an example of applying an aspect of the present disclosure to the audio devices 210A-210D. A summary of the behavior resulting from applying this aspect of the present disclosure to each loudspeaker is as follows:

- L1: orientation angle $q_1$ is small (in this example, less than 30 degrees), and therefore this loudspeaker is fully used (on).
- L2: orientation angle $q_2$ is large (in this example, close to 180 degrees), and therefore some aspects of the present disclosure would indicate that this loudspeaker should be completely or substantially disabled (turned off). However, in this example, a measure of the loudspeaker's importance for spatial rendering is high because L2 is the only loudspeaker behind the listener. As a result, in this example loudspeaker L2 is not penalized, but is left completely enabled (on).
- L3: orientation angle $q_3$ is relatively small (in this example, less than 60 degrees), and therefore this loudspeaker is fully used (on).
- L4: orientation angle $q_4$ is relatively small (in this example, less than 60 degrees), and therefore this loudspeaker is fully used (on).
- L5: orientation angle $q_5$ is relatively large (in this example, between 130 and 150 degrees), and therefore some aspects of the present disclosure would indicate that this loudspeaker should be completely (or at least partially) disabled. Moreover, in this example a measure of the loudspeaker's importance for spatial rendering is low because there exist other loudspeakers in the same enclosure, L3 and L4, in close proximity that are pointed substantially at the listening position. As a result, loudspeaker L5 is left completely disabled (off) in this example.
- L6: orientation angle $q_6$ is relatively large (in this example, close to 180 degrees), and therefore some aspects of the present disclosure would indicate that this loudspeaker should be completely or at least partially disabled. According to this example, a measure of the loudspeaker's importance for spatial rendering is relatively low because there exist other loudspeakers in a different enclosure, L3 and L4, in relatively close proximity that are pointed substantially at the listening position. As a result, loudspeaker L6 is completely disabled (off) in this example.

The following paragraphs disclose an implementation that may achieve the results that are described with reference FIG. 3. A flexible rendering system is described in detail below which casts the rendering problem as one of cost function minimization, where the cost function includes two terms. A first term models how closely a desired spatial impression is achieved as a function of speaker activation and a second term assigns a cost to activating the speakers. In some examples, one purpose of this second term is creating a sparse solution where only speakers in close proximity to the desired spatial position of the audio being rendered are activated. According to some examples, the cost function includes one or more additional dynamically configurable terms to this activation penalty, allowing the spatial rendering to be modified in response to various possible controls.

In some aspects, this cost function may be represented by the following equation:

$$C(g) = C_{spatial}(g, \vec{o}, \{\vec{s}_i\}) + C_{proximity}(g, \vec{o}, \{\vec{s}_i\}) + \sum_j C_j(g, \{\{\hat{o}\}, \{\hat{s}_i\}, \{\hat{e}\}\}_j) \quad (1)$$

The derivation of equation 1 is set forth in detail below. In this example, the set $\{\vec{s}_i\}$ represents the positions of each loudspeaker of a set of M loudspeakers, $\vec{o}$ represents the desired perceived spatial position of an audio signal, and g represents an M-dimensional vector of speaker activations. The first term of the cost function is represented by $C_{spatial}$, and the second is split into $C_{proximity}$ and a sum of terms $C_j(g, \{\{\hat{o}\}, \{\hat{s}_i\}, \{\hat{e}\}\}_j)$ representing the additional costs. Each of these additional costs may be computed as a function of the general set $\{\{\hat{o}\}, \{s_i\}, \{\hat{e}\}\}_j$, with $\{\hat{o}\}$ representing a set of one or more properties of the audio signals being rendered, $\{\hat{s}_i\}$ representing a set of one or more properties of the speakers over which the audio is being rendered, and $\{\hat{e}\}$ representing one or more additional external inputs. In other words, each term $C_j(g, \{\{\hat{o}\}, \{\hat{s}_i\}, \{\hat{e}\}\}_j)$ returns a cost as a function of activations g in relation to a combination of one or more properties of the audio signals, speakers, and/or external inputs. It should be noted that the set $\{\{\hat{o}\}, \{\hat{s}_i\}, \{\hat{e}\}\}_j$ contains at a minimum only one element from any of $\{\hat{o}\}$, $\{\hat{s}_i\}$, or $\{\hat{e}\}$.

In some examples, one or more aspects of the present disclosure may be implemented by introducing one or more additional cost terms $C_j$ that is or are a function of $\{\hat{s}_i\}$, which represents properties of the loudspeakers in the audio environment. According to some such examples, the cost may be computed as a function of both the position and orientation of each speaker with respect to the listening position.

In some such examples, the general cost function of equation 1 may be represented as a matrix quadratic, as follows:

$$C(g) = g*Ag + Bg + C + g*Dg + \sum_j g*W_j g = g*\left(A + D + \sum_j W_j\right)g + Bg + C \tag{2}$$

The derivation of equation 2 is set forth in detail below. In some examples, the additional cost terms may each be parametrized by a diagonal matrix of speaker penalty terms, e.g., as follows:

$$W_j = \begin{bmatrix} w_{1j} & \dots & 0 \\ \vdots & \ddots & \vdots \\ 0 & \dots & w_{Mj} \end{bmatrix} \tag{3}$$

Some aspects of the present disclosure may be implemented by computing a set of these speaker penalty terms $w_{ij}$ as a function of both the position and orientation of each speaker i. According to some examples, penalty terms may be computed over different subsets of loudspeakers across frequency, depending on each loudspeaker's capabilities (for example, according to each loudspeaker's ability to accurately reproduce low frequencies).

The following discussion assumes that the position and orientation of each loudspeaker i are known, in this example with respect to a listening position. Some detailed examples of determining, or at least estimating, the position and orientation of each loudspeaker i are set forth below. Some previously-disclosed flexible rendering methods already took into account the position of each loudspeaker with respect to the listening position. Some flexible rendering methods of the present disclosure further incorporate the orientation of the loudspeakers with respect to the listening position, as well as the positions of loudspeakers with respect to each other. The loudspeaker orientations have already been parameterized in this disclosure as orientation angles $\theta_1$. The positions of loudspeakers with respect to each other, which may reflect the potential for impairment to the spatial rendering introduced by the speaker's penalization, are parameterized herein as $\alpha_i$, which also may be referred to herein simply as $\alpha$. Accordingly, a may be referred to herein as a "loudspeaker importance metric."

According to some disclosed examples, loudspeakers may be nominally divided into two categories, "eligible" and "ineligible," meaning eligible or ineligible for penalization according to loudspeaker orientation. In some such examples, a determination of whether a loudspeaker is eligible or ineligible may be based, at least in part, on the loudspeaker's orientation angle $\theta_i$. In some such examples, a determination of whether a loudspeaker is eligible or ineligible may be based, at least in part, on whether the loudspeaker's orientation angle $\theta_i$ equals or exceeds an orientation angle threshold $T_\theta$. In some such examples, if a loudspeaker meets the condition $|\theta_i|>T_\theta$, the loudspeaker is eligible for penalization according to loudspeaker orientation; otherwise, the loudspeaker is ineligible. In one example, an orientation angle threshold $$T_\theta = \frac{11\pi}{18}$$

radians (110 degrees). However, in other examples, the orientation angle threshold $T_\theta$ may be greater than or less than 110 degrees, e.g., 100 degrees 105 degrees, 115 degrees, 120 degrees, etc. According to some examples, the position of each eligible speaker may be considered in relation to the position of the ineligible or well-oriented loudspeakers. In some such examples, for an eligible loudspeaker i, the loudspeakers $i_1$ and $i_2$ with the shortest clockwise and counterclockwise angular distances $\phi_1$ and $\phi_2$ from i may be identified in the set of ineligible loudspeakers. Angular distances between speakers may, in some such examples, be determined by casting loudspeaker positions onto a unit circle with the listening position at the center of unit circle.

In order to encapsulate the potential impairment, in some examples a loudspeaker importance metric $\alpha$ may be devised as a function of $\phi_1$ and $\phi_2$. In some examples, the loudspeaker importance metric $\alpha_i$ for a loudspeaker i corresponds with the unit perpendicular distance from the loudspeaker i to a line connecting loudspeakers $i_1$ and $i_2$, which are two loudspeakers adjacent to the loudspeaker i. Following is one such example in which the loudspeaker importance metric $\alpha$ is expressed as a function of $\phi_1$ and $\phi_2$.

Figure 4:
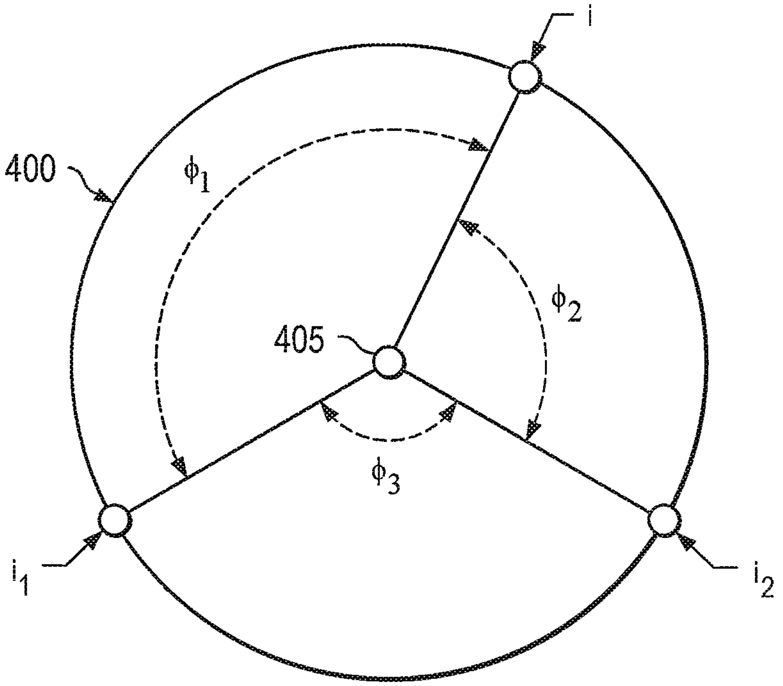
FIG. 4 shows an example of loudspeakers positioned on a circumference of a unit circle.

FIG. 4 shows an example of loudspeakers positioned on a circumference of a unit circle. In this example, loudspeakers i, $i_1$ and $i_2$ are positioned on the circumference of the circle 400, with loudspeaker i, being positioned between loudspeaker $i_1$ and loudspeaker $i_2$. According to this example, the center 405 of the circle 400 corresponds to a listener location. In this example, the angular distance between loudspeaker i and loudspeaker $i_1$ is $\phi_1$, the angular distance between loudspeaker i and loudspeaker $i_2$ is $\phi_2$ and the angular distance between loudspeaker $i_1$ and loudspeaker $i_2$ is $\phi_2$. A circle contains $2\pi$ radians, so $\phi_1+\phi_2+\phi_3=2\pi$.

Figure 5:
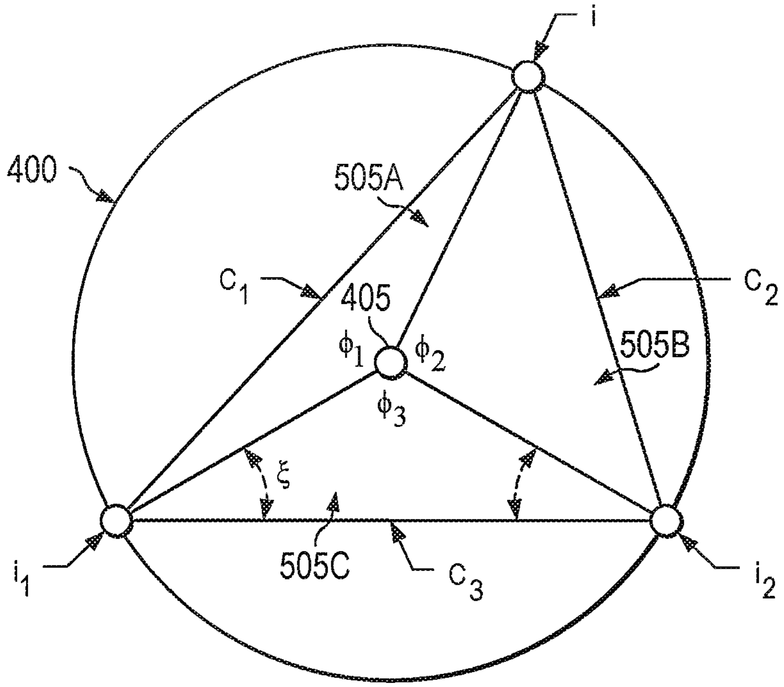
FIG. 5 shows the loudspeaker arrangement of FIG. 4, with chords connecting the loudspeaker locations.

FIG. 5 shows the loudspeaker arrangement of FIG. 4, with chords connecting the loudspeaker locations. In this example, chord $C_1$ connects loudspeaker i and loudspeaker $i_1$, chord $C_2$ connects loudspeaker i and loudspeaker $i_2$, and chord $C_3$ connects loudspeaker $i_1$ and loudspeaker $i_2$. By definition, the chord length $C_N$ on a unit circle across angle $\phi_N$ may be expressed as $C_N=\sin(\phi_N/2)$.

Each of the internal triangles 505*a*, 505*b* and 505*c* is an isosceles triangle having center angles $Y_1$, $\phi_2$ and $\phi_3$, respectively. An arbitrary internal triangle would also be isosceles and would have a center angle $\phi_n$. The interior angles of a triangle sum to $\pi$ radians. Each of the remaining congruent angles of the arbitrary internal triangle is therefore half of $(\pi-\phi_n)$ radians. One such angle, $\zeta_n=(\pi-\phi_n)/2$, is shown in FIG. 5.

Figure 6:
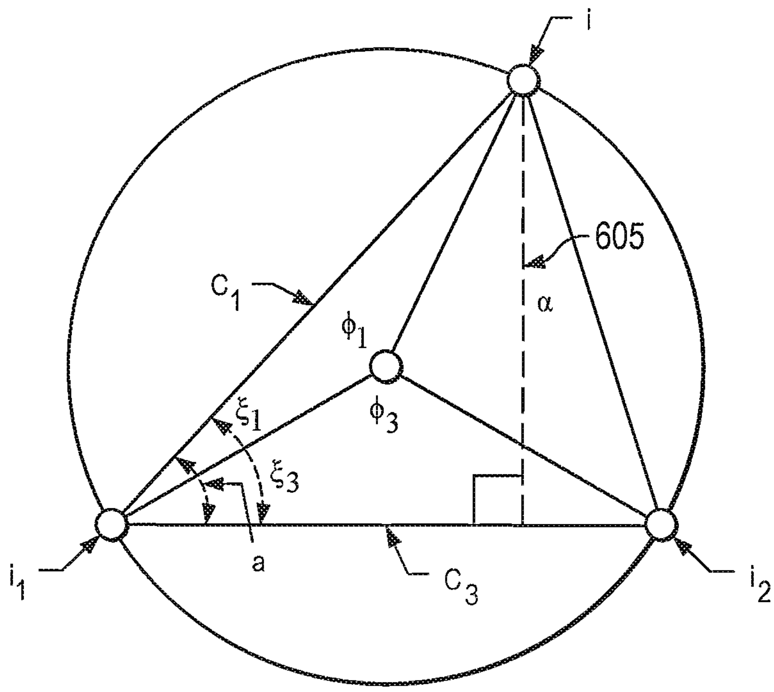
FIG. 6 shows the loudspeaker arrangement of FIG. 5, with one chord omitted.

FIG. 6 shows the loudspeaker arrangement of FIG. 5, with one chord omitted. In this example, chord $C_2$ of FIG. 5 has been omitted in order to better illustrate triangle 605, which includes side $\alpha$ perpendicular to chord $C_3$ and extending from chord $C_3$ to loudspeaker i. According to this example, the interior angle $\alpha$ of triangle 605 may be expressed as $\alpha=\zeta_1+\zeta_2$.

The law of sines defines the relationships between interior angles $\alpha$, b, and c of a triangle and the lengths of the sides opposite each interior angle $\alpha$, $\beta$ and $\gamma$ as follows:

$$\frac{\sin a}{a} = \frac{\sin b}{\beta} = \frac{\sin c}{\gamma}$$

In the example of triangle 605, the law of sines indicates:

$$\frac{\sin a}{\alpha} = \frac{(\sin\pi/2) = 1}{C1}.$$

Therefore, $\alpha = C_1 \sin\alpha = C_1 \sin(\zeta_1+\zeta_2) = \sin(\phi_2/2)\sin(\zeta_1+\zeta_2)$. However, $$\xi_1 + \xi_2 = \frac{\pi-\phi_1}{2} + \frac{\pi-\phi_3}{2} = \pi - \frac{\phi_1+\phi_3}{2} = \frac{\phi_2}{2}$$

Accordingly, the loudspeaker importance metric alpha may be expressed as follows:

$$a = \sin\frac{\phi_1}{2}\cdot\sin\frac{\phi_2}{2} \tag{4}$$

In some implementations, $\phi_1$ or $\phi_2$ may be greater than $\pi$ radians. In such instances, if $\alpha$ were computed according to equation 4, $\alpha$ would project outside the circle. In some such examples, equation 4 may be modified to $$\alpha = \sin\left(\frac{\min(\phi_1, \phi_2)}{2}\right),$$

which is a better representation of the energy error that would be introduced by penalizing the corresponding loudspeaker.

In some examples, if $\phi_1$=$_2$, $\alpha$ may be computed as $$a = \sin\frac{\phi_1}{2},$$

because this function fits continuously into equation 4 when $\phi_1$ and $\phi_2$ are similar.

With the layout of loudspeakers shown in FIGS. 4, 5 and 6, according to some implementations loudspeaker i would not be turned off (and in some examples the relative activation of loudspeaker i would not be reduced) regardless of the loudspeaker orientation angle of loudspeaker i. This is because the distance between loudspeaker i and a line connecting loudspeakers $i_1$ and $i_2$, and therefore the corresponding loudspeaker importance metric of loudspeaker i, is too great.

Figure 7:
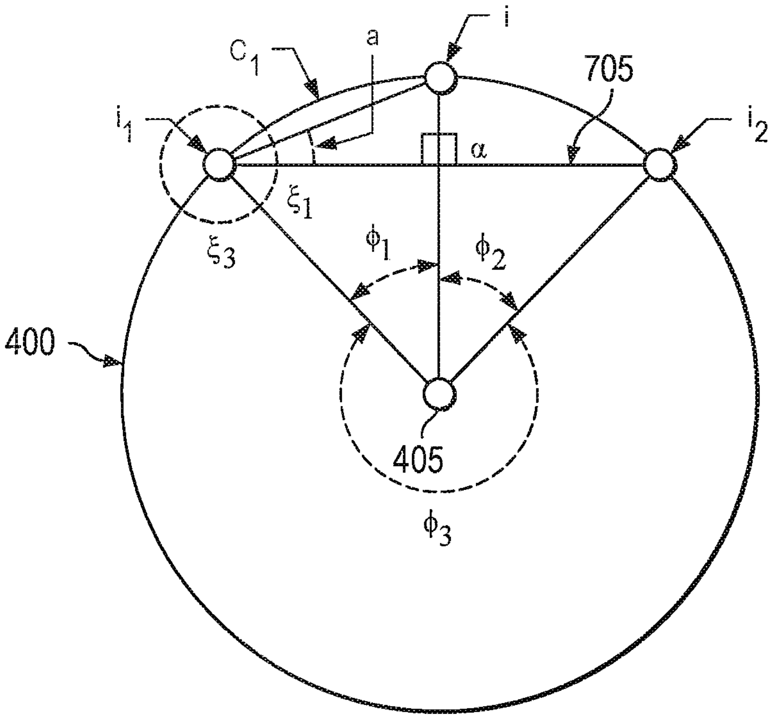
FIG. 7 shows an alternative example of loudspeakers positioned on a circumference of a unit circle.

FIG. 7 shows an alternative example of loudspeakers positioned on a circumference of a unit circle. In this example, loudspeakers i, $i_1$ and $i_2$ are positioned in different positions on the circumference of the circle 400, as compared to the positions shown in FIGS. 4, 5 and 6: here, loudspeakers i, $i_1$ and $i_2$ are all positioned in the same half of the circle 400. However, loudspeaker i is still positioned between loudspeaker $i_1$ and loudspeaker $i_2$, the angular distance between loudspeaker i and loudspeaker $i_1$ is still $\phi_2$, the angular distance between loudspeaker i and loudspeaker $i_2$ is still $\phi_2$ and the angular distance between loudspeaker $i_1$ and loudspeaker $i_2$ is still $\phi_2$. Moreover, the relationship $$a_i = \sin\frac{\phi_1}{2}\cdot\sin\frac{\phi_2}{2}$$

still holds. One may see that, as compared to that of FIG. 6, the distance between loudspeaker i and the line 705 connecting loudspeakers $i_1$ and $i_2$, and therefore the corresponding loudspeaker importance metric $\alpha_i$ of loudspeaker i, is substantially less. Therefore, according to some implementations loudspeaker i may be turned off, or the relative activation of loudspeaker i may at least be reduced, if the loudspeaker orientation angle $\theta_1$ equals or exceeds an orientation angle threshold $T_\theta$.

Figure 8:
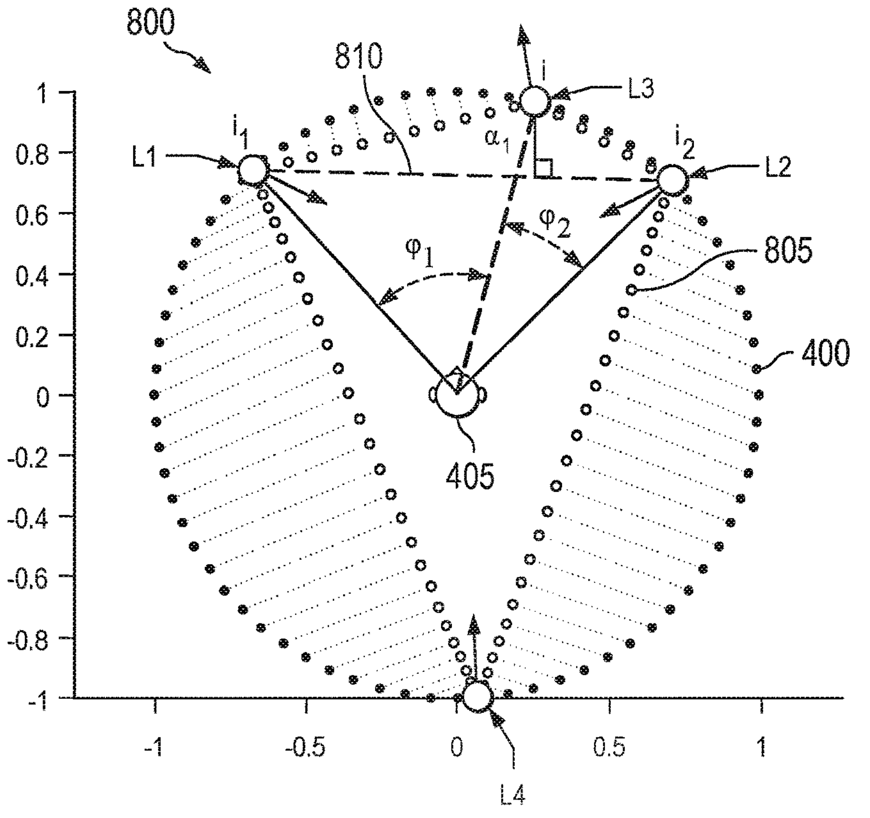
FIGS. 8 and 9 show alternative examples of loudspeakers positioned on a circumference of a unit circle.
Figure 9:
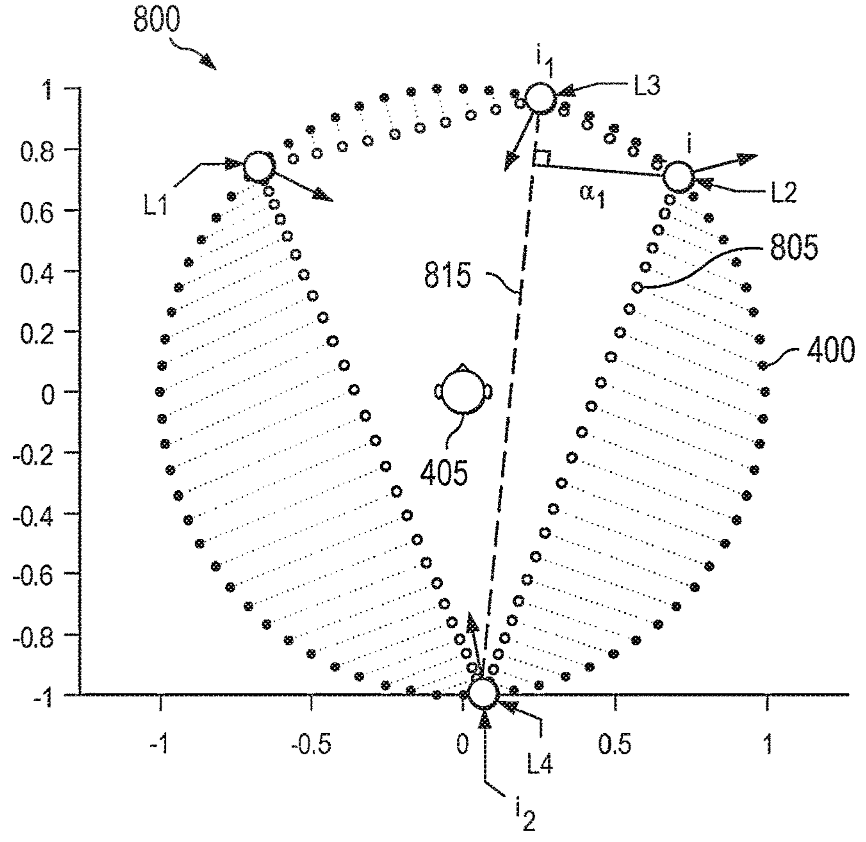

FIGS. 8 and 9 show alternative examples of loudspeakers positioned on a circumference of a unit circle. In this example, loudspeakers L1, L2 and L3 are all positioned in the same half of the circle 400. However, loudspeaker L4 is positioned in the other half of the circle 400. The arrows pointing outward from each of the loudspeakers L1-L4 indicate the direction of maximum acoustic radiation for each loudspeaker and therefore indicate the loudspeaker orientation angle $\theta$ for each loudspeaker. FIGS. 8 and 9 also show the convex hull of loudspeakers 805, formed by the loudspeakers L1-L4.

As before, the loudspeaker that is being evaluated will be referred to as loudspeaker i, and the loudspeakers adjacent to the loudspeaker that is being evaluated will be referred to as loudspeakers $i_1$ and $i_2$. Accordingly, in FIG. 8 loudspeaker L3 is designated as loudspeaker i, loudspeaker L1 is designated as loudspeaker $i_1$ and loudspeaker L2 is designated as loudspeaker $i_2$. In FIG. 8, the loudspeaker importance metric $\alpha_i$ indicates the relative importance of loudspeaker L3 for rendering an audio signal at the audio signal's intended perceived spatial position. In this example, the loudspeaker importance metric $\alpha_i$ corresponding to loudspeaker L3 is much less, for example, than the loudspeaker importance metric $\alpha$ corresponding to loudspeaker i of FIG. 6. Due to the relatively small loudspeaker importance metric $\alpha_i$ corresponding to loudspeaker L3, the spatial impairment that would be introduced by penalizing loudspeaker L3 (e.g., for having a loudspeaker orientation angle $\theta$ that equals or exceeds an orientation angle threshold $T_\theta$) may be acceptable.

In FIG. 9, loudspeaker L2 is designated as loudspeaker i, loudspeaker L3 is designated as loudspeaker $i_1$ and loudspeaker L4 is designated as loudspeaker $i_2$. Here, the loudspeaker importance metric $\alpha_i$ indicates the relative importance of loudspeaker L2 for rendering an audio signal at the audio signal's intended perceived spatial position. In this example, the loudspeaker importance metric $\alpha_i$ corresponding to loudspeaker L2 is greater than the loudspeaker importance metric $\alpha_i$ corresponding to loudspeaker L3 in FIG. 8. Even though the loudspeaker importance metric $\alpha_i$ corresponding to loudspeaker L2 is much less than the loudspeaker importance metric $\alpha$ corresponding to loudspeaker i of FIG. 6, in some implementations the spatial impairment that would be introduced by penalizing loudspeaker L2 (e.g., for having a loudspeaker orientation angle $\theta$ that equals or exceeds an orientation angle threshold $T_\theta$) may not be acceptable.

In some examples, the loudspeaker importance metric $\alpha_1$ may correspond to a particular behavior of the spatial cost system above. When the target audio object locations lie outside the convex hull of loudspeakers 805, according to some examples the solution with the least possible error places audio objects on the convex hull of speakers. In some such examples, the line connecting loudspeakers $i_1$ and $i_2$ would be part of the convex hull of loudspeakers 805 if loudspeaker i were penalized to the extent that it is deactivated, and therefore this line would become part of the minimum error solution. For example, referring to FIG. 8, if the loudspeaker L3 were deactivated, the convex hull of loudspeakers 805 would be include the line 810 instead of the chords between loudspeakers L1, L3 and L2. Referring to FIG. 9, if the loudspeaker L2 were deactivated, the convex hull of loudspeakers 805 would be include the line 815 instead of the chords between loudspeakers L3, L2 and L4. One may readily see that the loudspeaker importance metric $\alpha_i$ directly correlates with the reduction in size of the convex hull of loudspeakers 805 caused by deactivating the corresponding loudspeaker: the perpendicular distance from the speaker in question to the line connecting the adjacent loudspeakers is the point of maximum divergence between the solutions with and without a deactivation penalty on that loudspeaker. For at least these reasons, the loudspeaker importance metric $\alpha_i$ is an apt metric for representing the potential for spatial impairment introduced when penalizing a speaker.

According to some examples, for each loudspeaker that is eligible for penalization based on that loudspeaker's orientation angle, the loudspeaker importance metric $\alpha_i$ may be computed. The larger the value of $\alpha_i$, the larger the potential for error. This is demonstrated in FIGS. 8 and 9: $\alpha_i$ in FIG. 8 is smaller than $\alpha_i$ in FIG. 9, and therefore the convex hull of loudspeakers 805 caused by deactivating the corresponding loudspeaker is substantially larger in FIG. 8 than in FIG. 9, and so is the space available for audio object panning. Accordingly, the spatial impairment introduced by penalizing i in FIG. 8 may be acceptable, while the spatial impairment introduced by penalizing i in FIG. 9 may not be acceptable. To this effect, an importance metric threshold $T_\alpha$ may be determined for $\alpha_i$. In some such examples, if both $\alpha_i<T_a$ and $|\theta_i|>T_\Theta$ for a loudspeaker i, a penalty $w_{ij}$ may be computed (for example, according to equation 3) and applied to the loudspeaker as a function of the loudspeaker orientation angle. According to some examples, the importance metric threshold $T_\alpha$ may be in the range of 0.1 to 0.35, e.g., 0.1, 0.15, 0.2, 0.25, 0.30 or 0.35. In other examples, the importance metric threshold $T_\alpha$ may be set to a higher or lower value.

Depending on the relative magnitudes of penalties in a cost function optimization, any particular penalty may be designed to elicit absolute or gradual behavior. In the case of the renderer cost function, a large enough penalty will exclude or disable a loudspeaker altogether, while a smaller penalty may quiet a loudspeaker without muting it. The arctangent function $\tan^{-1} x$ is an advantageous functional form for penalties, because it can be manipulated to reflect this behavior. $\tan^{-1}(x\to\pm\infty)$ is effectively a step function or a switch, while $\tan^{-1}(x\to 0)$ is effectively a linear ramp. Intermediate ranges yield intermediate behavior. Therefore, selecting a range of the arctangent about x=0 as the functional form of a penalty enables a significant level of control over system behavior.

For example, the penalty $w_{ij}$ of equation 3 may be constructed generally as the multiplication of unit arctangent functions of $\alpha_i$ and $\theta_i$, respectively, along with a scaling factor $\eta$ for precise penalty behavior. Equation 5 provides one such example:

$$w_{ij}(\theta_i, \alpha_i) = \eta xy = \eta \cdot f_\alpha\left[\tan^{-1}(\alpha_i, T_\alpha)\right] \cdot f_\theta\left[\tan^{-1}(\Theta_i, T_\Theta)\right] \quad (5)$$

In some examples, both x and $\gamma\in[0,1]$. The specific scaling factor and respective arctangent functions may be constructed to ensure precise and gradual deactivation of loudspeaker i from use as a function of both $\theta_i$ and $\alpha_i$. In some examples, the arctangent functions x and y of equation 5 may be constructed as follows, with the scale factor $\eta$=5.0 in these examples:

$$x = 0.5 \cdot \left\{ \frac{\tan^{-1}\left[\left(\frac{|\theta| - T_\theta}{\pi - T_\theta}\right) \cdot 2r - r\right]}{\tan^{-1}(r)} + 1 \right\} \text{ for } r = 1,\ T_\Theta \le |\theta| \le \pi. \quad (6)$$

$$y = \frac{\tan^{-1}\left[\left(1 - \frac{\alpha}{T_\alpha}\right) \cdot 2r - \frac{r}{2}\right] - \tan^{-1}\left(-r + \frac{r}{2}\right)}{\tan^{-1}\left(r + \frac{r}{2}\right) - \tan^{-1}\left(-r + \frac{r}{2}\right)} \text{ for } r = 2,\ 0 \le \alpha \le T_\alpha. \quad (7)$$

In equations 6 and 7, "r" represents an arctangent function tuning factor that corresponds with half of the range of the arctan function that is being sampled. For r=1, the total output space of the arctan function that is being sampled has a length of 2. FIGS. 10 and 11 show equations 6 and 7 of this disclosure, respectively, with elements of each equation identified. In these examples, elements 1010*a* and 1010*b* are input variables that are scaled according to the thresholds $T_\Theta$ and $T_\alpha$, respectively. According to these examples, elements 1015*a* and 1015*b* allow the input variables to be expanded across a desired arctangent domain. According to these examples, elements 1020*a* and 1020*b* cause the input variables to be shifted such that the center aligns as desired with the arctangent function, for example such that x is centered on 0. In these examples, elements 1025*a*, 1025*b* and 1025*c* scale the output of equations 6 and 7 to be in the range of [0,1]. Elements 1025*d* normalize the function output by the maximum numerator input.

Figure 12A:
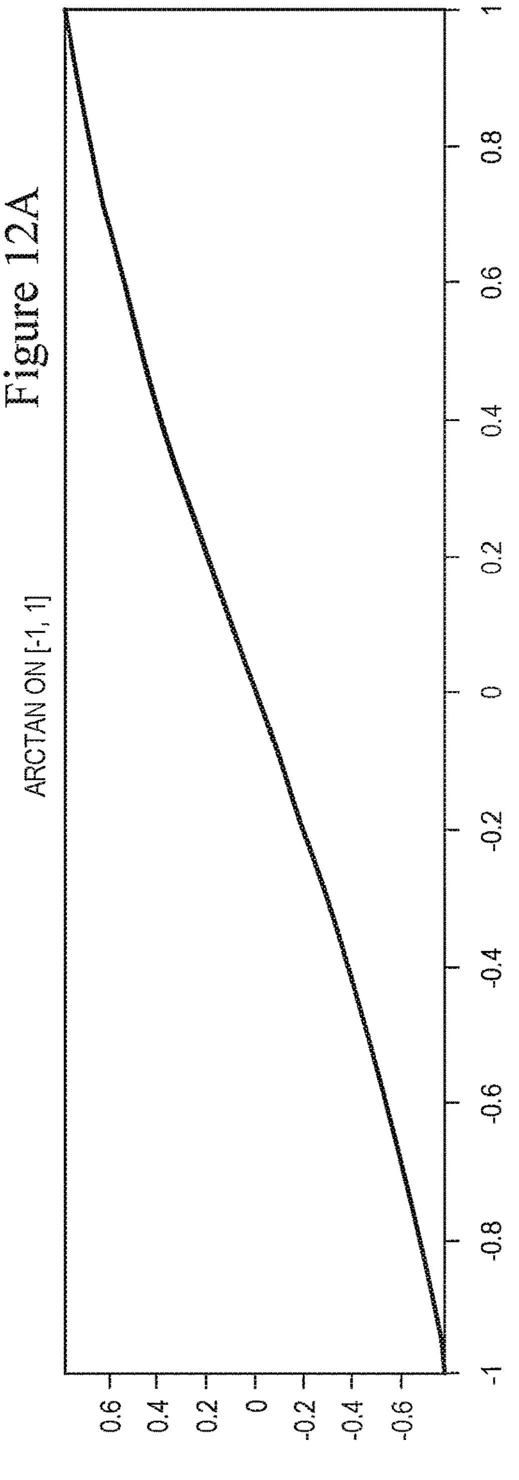
FIGS. 12A and 12B are graphs that correspond to equation 6 of this disclosure.
Figure 12B:
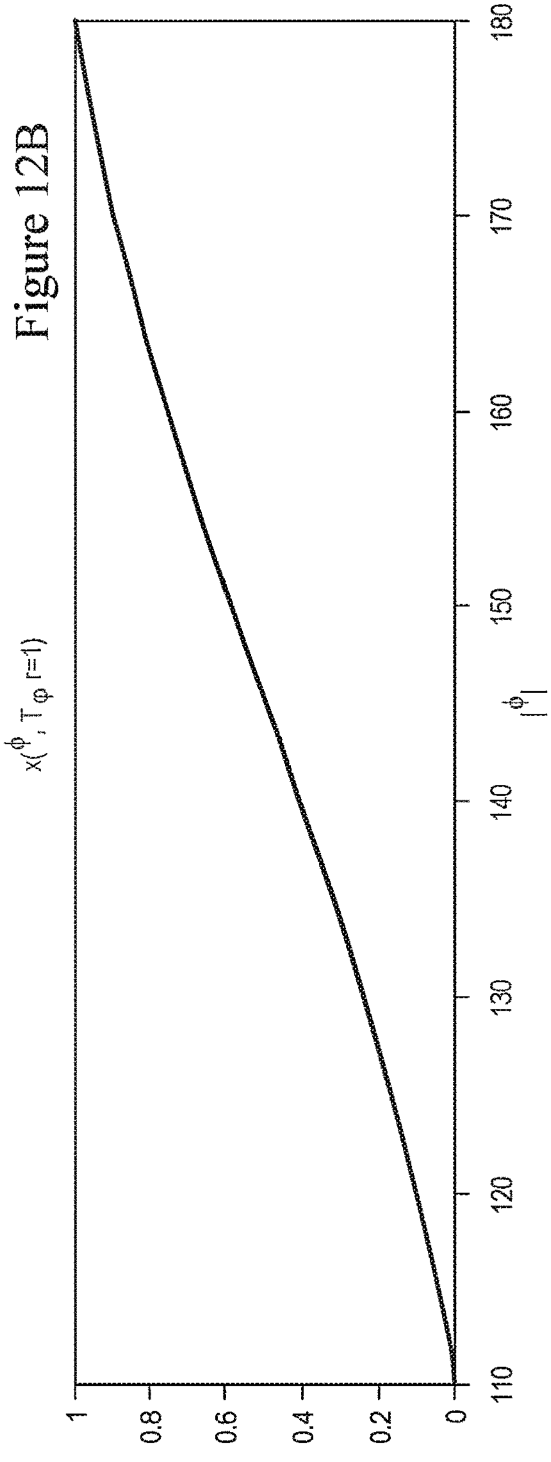
Figure 13A:
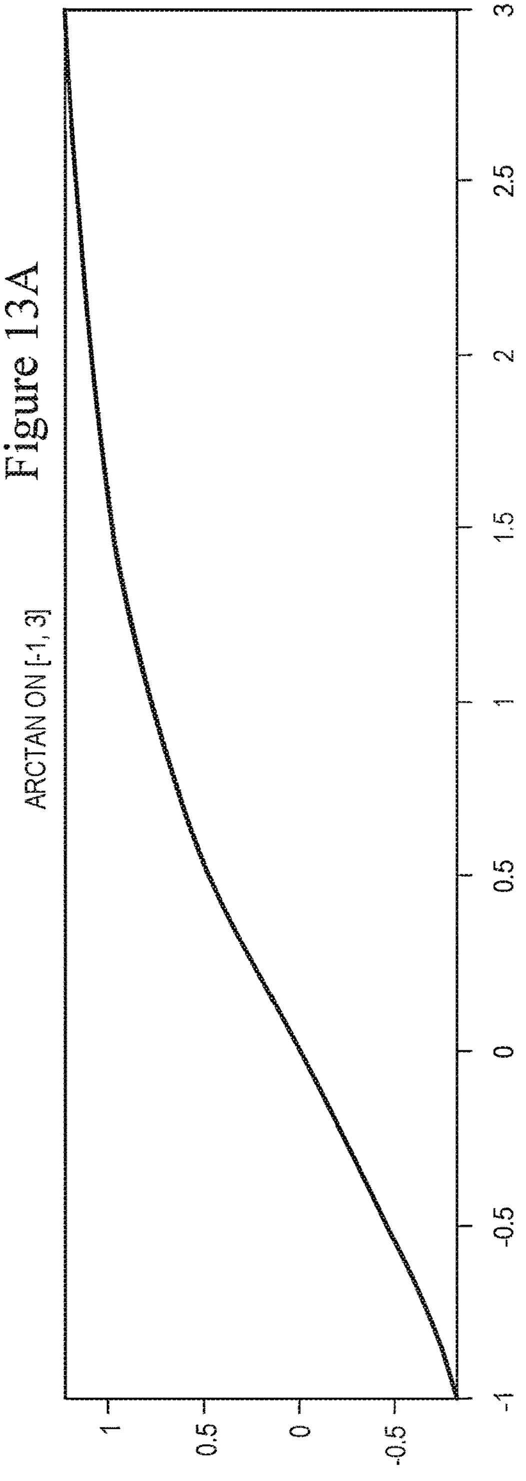
FIGS. 13A and 13B are graphs that correspond to equation 7 of this disclosure.
Figure 13B:
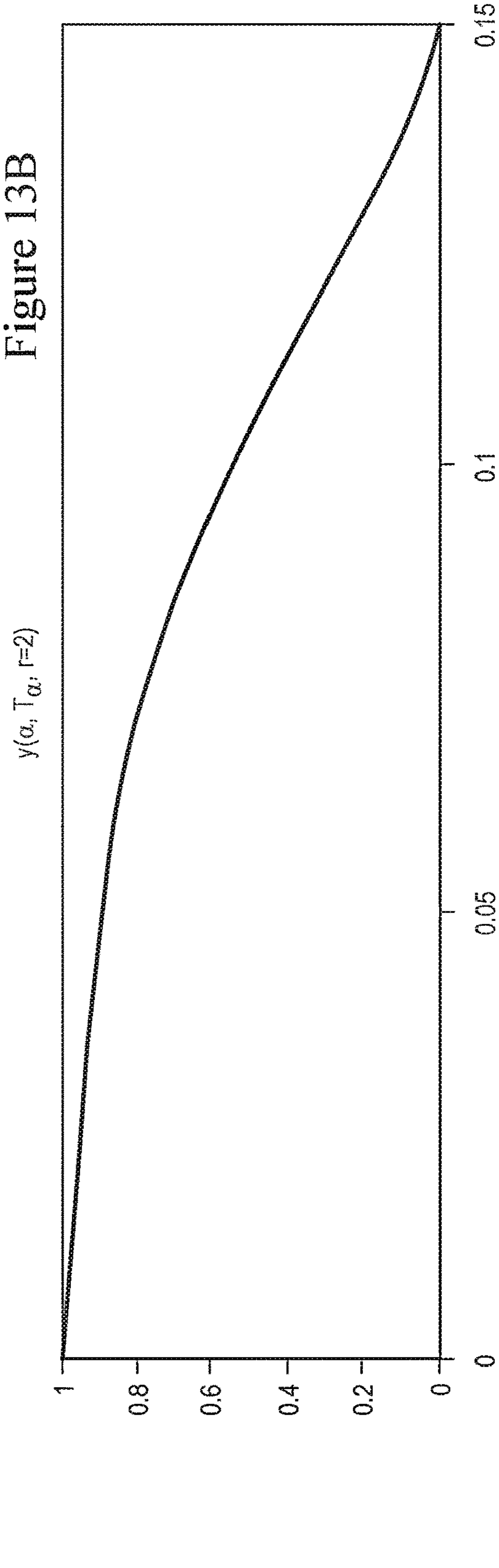

FIGS. 12A and 12B are graphs that correspond to equation 6 of this disclosure. FIGS. 13A and 13B are graphs that correspond to equation 7 of this disclosure. FIGS. 12A and 13A are sections of arctangent with domain of length 2*r*. FIGS. 12B and 13B correspond to the same arctangent curve segment as FIGS. 12A and 13A, respectively, over the domain of the input variable where the penalty applies and in the range [0, 1], having been transformed according to equations 6 and 7, respectively.

FIGS. 12A-13B illustrate features that make the arctangent function an advantageous functional form for penalties. In the examples of FIGS. 12A and 12B, r=1, so the total output space of the arctan function that is being sampled has a length of 2. In the middle portion of these curves (for example, from −0.5 to 0.5), the function approximates a linear ramp. In the examples of FIGS. 13A and 13B, r=2, so the total output space of the arctan function that is being sampled has a length of 4. In these examples, a relatively smaller portion of the displayed arctan function approximates a linear ramp. For values in the range from 1.5 to 3, there much less change in the function than for values near zero. Accordingly, using the arctangent as the functional form of a penalty, along with selecting a desired value of r, enable a significant level of control over system behavior.

Figure 13C:
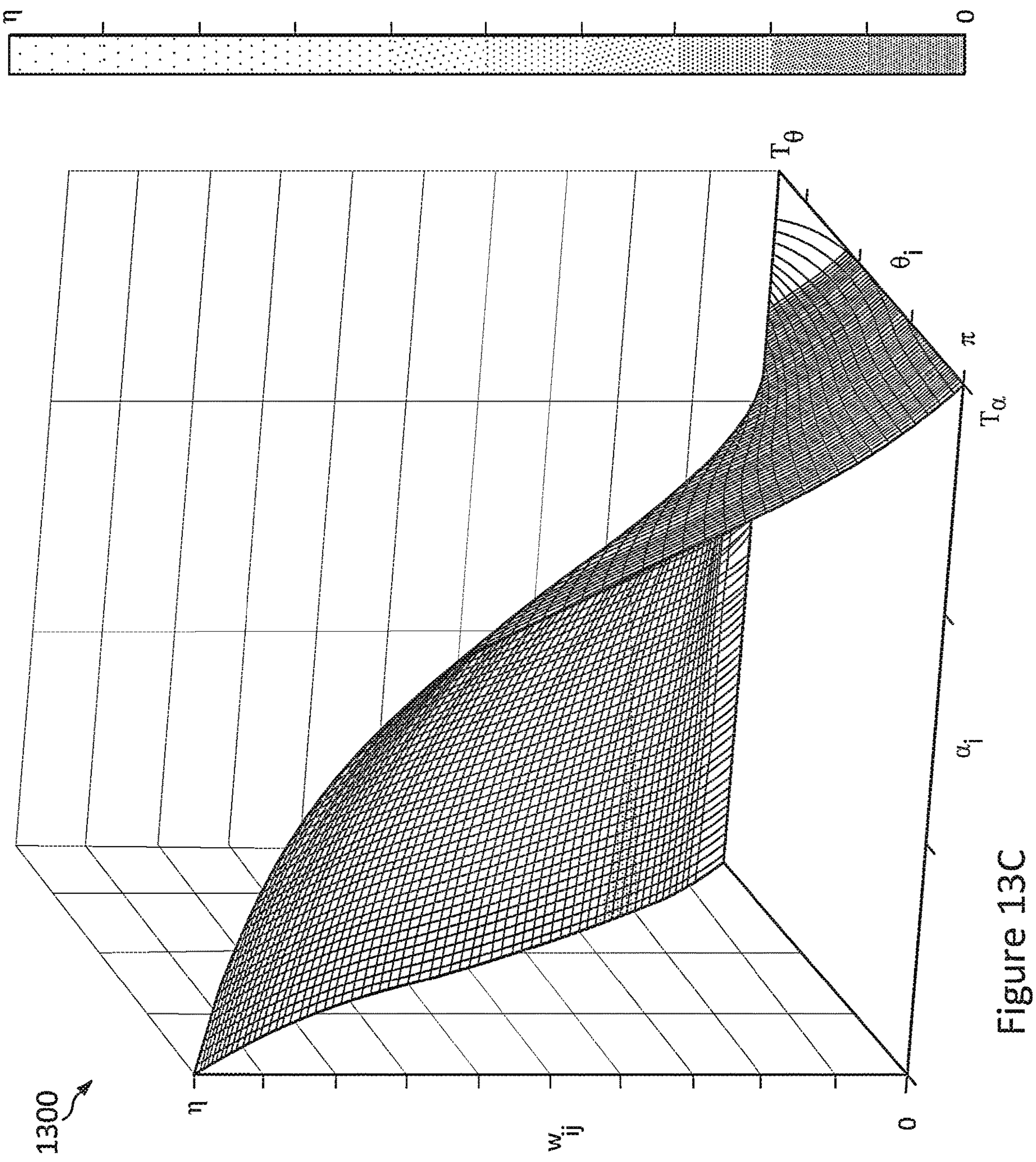
FIG. 13C is a graph that illustrates one example of a penalty function that is based on a loudspeaker orientation and an importance metric.

FIG. 13C is a graph that illustrates one example of a penalty function that is based on a loudspeaker orientation and an importance metric. In this example, the graph 1300 shows an example of the penalty function $w_{ij}(\theta_i, \alpha_i)$ of equation 5. According to this example, the penalty function $w_{ij}(\theta_i, \alpha_i)$ is defined for $T_\Theta<|\theta_i|\le\pi$ and $0\le\alpha_i<T_\alpha$. The former condition requires the loudspeaker to be oriented sufficiently away from the listening position, and the latter condition requires the speaker to be sufficiently close to other speakers such that the spatial image is not impaired by its deactivation, or reduced activation. If these conditions are met, the application of a penalty $w_{ij}$ to speaker i results in enhanced imaging of audio objects via flexible rendering. For any particular value of $\alpha_i$ in FIG. 13, the value of the penalty $w_{ij}$ increases as $|\theta_i|$ increases from $T_\theta$ to $\pi$. As such, the activation of speaker i is reduced as its orientation increases away from the listening position. Additionally, for any fixed value of $|\theta_i|$, the penalty $w_{ij}$ decreases as $\alpha_i$ increases from 0 to $T_\alpha$. This means that the amount by which the activation of speaker i is reduced becomes smaller as the importance metric $\alpha_i$, which is a measure of the loudspeaker's importance for spatial rendering, increases.

Figure 14:
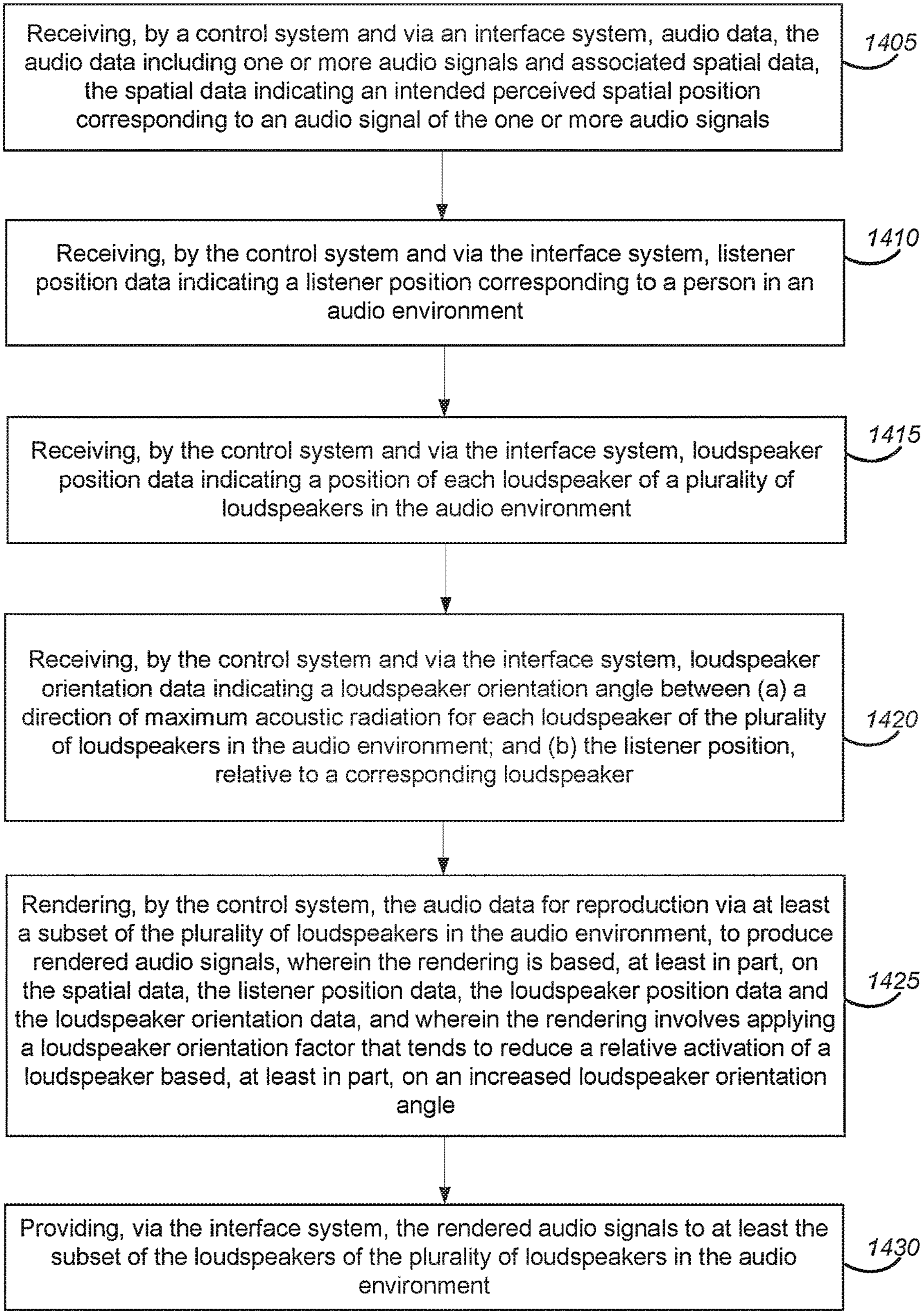
FIG. 14 is a flow diagram that outlines an example of a disclosed method.

FIG. 14 is a flow diagram that outlines an example of a disclosed method. In some examples, method 1400 may be performed by an apparatus such as that shown in FIG. 1. In some examples, method 1400 may be performed by a control system of an orchestrating device, which may in some instances be an audio device. The blocks of method 1400, like other methods described herein, are not necessarily performed in the order indicated. Moreover, such methods may include more or fewer blocks than shown and/or described.

In this example, block 1405 involves receiving, by a control system and via an interface system, audio data. According to this example, the audio data includes one or more audio signals and associated spatial data. In this example, the spatial data indicates an intended perceived spatial position corresponding to an audio signal of the one or more audio signals. In some such examples, the spatial data may be, or may include, metadata. According to some examples, the metadata may correspond to an audio object. In some such examples, the audio signal may correspond to the audio object. In some instances, the audio data may be part of a content stream of audio signals, and in some cases video signals, at least portions of which are meant to be heard together. Examples include a selection of music, a movie soundtrack, a movie, a television program, the audio portion of a television program, a podcast, a live voice call, a synthesized voice response from a smart assistant, etc. In some examples, the audio data may be received from another apparatus, e.g., via wireless communications. In other instances, the audio data may be received, or retrieved, from a memory of the same apparatus that includes the control system.

According to this example, block 1410 involves receiving, by the control system and via the interface system, listener position data. In this example, the listener position data indicates a listener position corresponding to a person in an audio environment. In some instances, the the listener position data may indicate a position of the listener's head. In some implementations block 1410, or another block of method 1400, may involve receiving listener orientation data. Various methods of estimating a listener position and orientation are disclosed herein.

In this example, block 1415 involves receiving, by the control system and via the interface system, loudspeaker position data indicating a position of each loudspeaker of a plurality of loudspeakers in the audio environment. In some examples, the plurality may include all loudspeakers in the audio environment, whereas in other examples the plurality may include only a subset of the total number of loudspeakers in the audio environment.

According to this example, block 1420 involves receiving, by the control system and via the interface system, loudspeaker orientation data. The loudspeaker orientation data may vary according to the particular implementation. In this example, the loudspeaker orientation data indicates a loudspeaker orientation angle between (a) a direction of maximum acoustic radiation for each loudspeaker of the plurality of loudspeakers in the audio environment; and (b) the listener position, relative to a corresponding loudspeaker. According to some such examples, the loudspeaker orientation angle for a particular loudspeaker may be an angle between (a) the direction of maximum acoustic radiation for the particular loudspeaker and (b) a line between a position of the particular loudspeaker and the listener position. In other examples, the loudspeaker orientation data may indicate a loudspeaker orientation angle according to another frame of reference, such as an audio environment coordinate system, an audio device reference frame, etc. Alternatively, or additionally, in some examples the loudspeaker orientation angle may not be defined according to a direction of maximum acoustic radiation for each loudspeaker, but may instead be defined in another manner, e.g., by the orientation of a device that includes the loudspeaker.

In this example, block 1425 involves rendering, by the control system, the audio data for reproduction via at least a subset of the plurality of loudspeakers in the audio environment, to produce rendered audio signals. According to this example, the rendering is based, at least in part, on the spatial data, the listener position data, the loudspeaker position data and the loudspeaker orientation data. In this example, the rendering involves applying a loudspeaker orientation factor that tends to reduce a relative activation of a loudspeaker based, at least in part, on an increased loudspeaker orientation angle. In this example, block 1430 involves providing, via the interface system, the rendered audio signals to at least the subset of the loudspeakers of the plurality of loudspeakers in the audio environment.

In some examples, method 1400 may involve estimating a loudspeaker importance metric for at least the subset of the loudspeakers. According to some examples, the loudspeaker importance metric may correspond to a loudspeaker's importance for rendering an audio signal at the audio signal's intended perceived spatial position. In some examples, the rendering for each loudspeaker may be based, at least in part, on the loudspeaker importance metric.

According to some implementations, the rendering for each loudspeaker may involve modifying an effect of the loudspeaker orientation factor based, at least in part, on the loudspeaker importance metric. In some such examples, the rendering for each loudspeaker may involve reducing an effect of the loudspeaker orientation factor based, at least in part, on an increased loudspeaker importance metric.

According to some examples, method 1400 may involve determining whether a loudspeaker orientation angle equals or exceeds a threshold loudspeaker orientation angle. In some such examples, method 1400 may involve applying the loudspeaker orientation factor only if the loudspeaker orientation angle equals or exceeds the threshold loudspeaker orientation angle. In some examples, an "eligible loudspeaker" may be a loudspeaker having a loudspeaker orientation angle that equals or exceeds the threshold loudspeaker orientation angle. In this context, an "eligible loudspeaker" is a loudspeaker that is eligible for penalizing, e.g., eligible for being turned down (reducing the relative speaker activation) or turned off.

In some examples, the loudspeaker importance metric of a particular loudspeaker may be based, at least in part, on the position of that particular loudspeaker relative to the position of one or more other loudspeakers. For example, if a loudspeaker is relatively close to another loudspeaker, the perceptual change caused by penalizing either of these closely-spaced loudspeakers may be less than the perceptual change caused by penalizing another loudspeaker that is not close to other loudspeakers in the audio environment.

According to some examples, the loudspeaker importance metric may be based, at least in part, on a distance between an eligible loudspeaker and a line between (a) a first loudspeaker having a shortest clockwise angular distance from the eligible loudspeaker and (b) a second loudspeaker having a shortest counterclockwise angular distance from the eligible loudspeaker. This distance may, in some examples, correspond to the loudspeaker importance metric $\alpha$ that is disclosed herein. As noted above, in some examples an "eligible" loudspeaker is a loudspeaker having a loudspeaker orientation angle that equals or exceeds a threshold loudspeaker orientation angle. In some examples, the first loudspeaker and the second loudspeaker may be ineligible loudspeakers having loudspeaker orientation angles that are less than the threshold loudspeaker orientation angle. These ineligible loudspeakers may be ineligible for penalizing, e.g., ineligible for being turned down (reducing the relative speaker activation) or turned off.

In some examples, the rendering of block 1425 may involve determining relative activations for at least the subset of the loudspeakers by optimizing a cost function. In some such examples, block 1425 may involve determining relative activations for at least the subset of the loudspeakers by optimizing a cost that is a function of: a model of perceived spatial position of an audio signal of the one or more audio signals when played back over the subset of loudspeakers in the audio environment; a measure of proximity of the intended perceived spatial position of the audio signal to a position of each loudspeaker of the subset of loudspeakers; and one or more additional dynamically configurable functions.

According to some examples, at least one of the one or more additional dynamically configurable functions may be based, at least in part, on the loudspeaker orientation factor. In some examples, at least one of the one or more additional dynamically configurable functions may be based, at least in part, on the loudspeaker importance metric. According to some examples, at least one of the one or more additional dynamically configurable functions may be based, at least in part, on a measurement or estimate of acoustic transmission from each loudspeaker in the audio environment to one or more other loudspeakers in the audio environment.

Examples of Audio Device Location and Orientation Estimation Methods

As noted in the description of FIG. 14 and elsewhere herein, in some examples audio processing changes (such as those corresponding to loudspeaker orientation, a loudspeaker importance metric, or both) may be based, at least in part, on audio device location and audio device orientation information. The locations and orientations of audio devices in an audio environment may be determined or estimated by various methods, including but not limited to those described in the following paragraphs. This discussion refers to the locations and orientations of audio devices, but one of skill in the art will realize that a loudspeaker location and orientation may be determined according to an audio device location and orientation, given information about how one or more loudspeakers are positioned in a corresponding audio device.

Some such methods may involve receiving a direct indication by the user, e.g., using a smartphone or tablet apparatus to mark or indicate the approximate locations of audio devices on a floorplan or similar diagrammatic representation of the environment. Such digital interfaces are already commonplace in managing the configuration, grouping, name, purpose and identity of smart home devices. For example, such a direct indication may be provided via the Amazon Alexa smartphone application, the Sonos S2 controller application, or a similar application.

Some examples may involve solving the basic trilateration problem using the measured signal strength (sometimes called the Received Signal Strength Indication or RSSI) of common wireless communication technologies such as Bluetooth, Wi-Fi, ZigBee, etc., to produce estimates of physical distance between the audio devices, e.g., as disclosed in J. Yang and Y. Chen, "Indoor Localization Using Improved RSS-Based Lateration Methods," GLOBECOM 2009-2009 IEEE Global Telecommunications Conference, Honolulu, HI, 2009, pp. 1-6, doi: 10.1109/GLOCOM.2009.5425237 and/or as disclosed in Mardeni, R. & Othman, Shaifull & Nizam, (2010) "Node Positioning in ZigBee Network Using Trilateration Method Based on the Received Signal Strength Indicator (RSSI)" 46, both of which are hereby incorporated by reference.

In U.S. Pat. No. 10,779,084, entitled "Automatic Discovery and Localization of Speaker Locations in Surround Sound Systems," which is hereby incorporated by reference, a system is described which can automatically locate the positions of loudspeakers and microphones in a listening environment by acoustically measuring the time-of-arrival (TOA) between each speaker and microphone.

International Application Nos. PCT/US21/61506 and PCT/US21/61533, entitiled "AUTOMATIC LOCALIZATION OF AUDIO DEVICES" ("the Automatic Localization applications"), which are hereby incorporated by reference, disclose methods, devices and systems for automatically determining the locations and orientations of audio devices. FIGS. 4-9B, and the corresponding descriptions on pages 17-47, are specifically incorporated herein by reference. Some disclosed examples of the Automatic Localization applications involve receiving direction of arrival (DOA) data corresponding to sound emitted by at least a first smart audio device of the audio environment. In some implementations, the first smart audio device may include a first audio transmitter and a first audio receiver. In some examples, the DOA data may correspond to sound received by at least a second smart audio device of the audio environment. In some instances, the second smart audio device may include a second audio transmitter and a second audio receiver. In some examples, the DOA data may also correspond to sound emitted by at least the second smart audio device and received by at least the first smart audio device.

Some such methods may involve receiving, by the control system, configuration parameters. In some examples, the configuration parameters may correspond to the audio environment and/or may correspond to one or more audio devices of the audio environment. Some such methods may involve minimizing, by the control system, a cost function based at least in part on the DOA data and the configuration parameters, to estimate a position and/or an orientation of at least the first smart audio device and the second smart audio device.

According to some examples, the DOA data also may correspond to sound received by one or more passive audio receivers of the audio environment. In some examples, each of the one or more passive audio receivers may include a microphone array but, in some instances, may lack an audio emitter. In some such examples, minimizing the cost function also may provide an estimated location and orientation of each of the one or more passive audio receivers.

In some examples, the DOA data also may correspond to sound emitted by one or more audio emitters of the audio environment. In some instances, each of the one or more audio emitters may include at least one sound-emitting transducer but may, in some instances, lack a microphone array. In some such examples, minimizing the cost function also may provide an estimated location of each of the one or more audio emitters.

In some implementations, the DOA data also may correspond to sound emitted by third through $N^{th}$ smart audio devices of the audio environment, N corresponding to a total number of smart audio devices of the audio environment. In some examples, the DOA data also may correspond to sound received by each of the first through $N^{th}$ smart audio devices from all other smart audio devices of the audio environment. In some such examples, minimizing the cost function may involve estimating a position and/or an orientation of the third through $N^{th}$ smart audio devices.

According to some examples, the configuration parameters may include a number of audio devices in the audio environment, one or more dimensions of the audio environment, and/or one or more constraints on audio device location and/or orientation. In some instances, the configuration parameters may include disambiguation data for rotation, translation and/or scaling.

Some methods may involve receiving, by the control system, a seed layout for the cost function. The seed layout may, in some examples, specify a correct number of audio transmitters and receivers in the audio environment and an arbitrary location and orientation for each of the audio transmitters and receivers in the audio environment.

Some methods may involve receiving, by the control system, a weight factor associated with one or more elements of the DOA data. The weight factor may, for example, indicate at the availability and/or reliability of the one or more elements of the DOA data.

Some methods may involve obtaining, by the control system, one or more elements of the DOA data using a beamforming method, a steered power response method, a time difference of arrival method, a structured signal method, or combinations thereof.

Some methods may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such methods may involve estimating at least one playback latency and/or estimating at least one recording latency. In some examples, the cost function may operate with a rescaled position, a rescaled latency and/or a rescaled time of arrival.

According to some examples, the cost function may include a first term depending on the DOA data only. In some such examples, the cost function may include a second term depending on the TOA data only. In some such examples, the first term may include a first weight factor and the second term may include a second weight factor. In some instances, one or more TOA elements of the second term may have a TOA element weight factor indicating the availability and/or reliability of each of the one or more TOA elements.

In some examples, the configuration parameters may include playback latency data, recording latency data, data for disambiguating latency symmetry, disambiguation data for rotation, disambiguation data for translation, disambiguation data for scaling, and/or one or more combinations thereof.

Some other aspects of the present disclosure may be implemented via methods. Some such methods may involve device location. For example, some methods may involve localizing devices in an audio environment. Some such methods may involve obtaining, by a control system, direction of arrival (DOA) data corresponding to transmissions of at least a first transceiver of a first device of the environment. The first transceiver may, in some examples, include a first transmitter and a first receiver. In some instances, the DOA data may correspond to transmissions received by at least a second transceiver of a second device of the environment. In some examples, the second transceiver may include a second transmitter and a second receiver. In some instances, the DOA data may correspond to transmissions from at least the second transceiver received by at least the first transceiver.

In some examples, the first device and the second device may be audio devices and the environment may be an audio environment. According to some such examples, the first transmitter and the second transmitter may be audio transmitters. In some such examples, the first receiver and the second receiver may be audio receivers. In some implementations, the first transceiver and the second transceiver may be configured for transmitting and receiving electromagnetic waves.

Some such methods may involve receiving, by the control system, configuration parameters. In some instances, the configuration parameters may correspond to the environment, and/or may correspond to one or more devices of the environment. Some such methods may involve minimizing, by the control system, a cost function based at least in part on the DOA data and the configuration parameters, to estimate a position and/or an orientation of at least the first device and the second device.

In some examples, the DOA data also may correspond to transmissions received by one or more passive receivers of the environment. Each of the one or more passive receivers may, for example, include a receiver array but may lack a transmitter. In some such examples, minimizing the cost function also may provide an estimated location and/or orientation of each of the one or more passive receivers.

According to some examples, the DOA data also may correspond to transmissions from one or more transmitters of the environment. In some instances, each of the one or more transmitters may lack a receiver array. In some such examples, minimizing the cost function also may provide an estimated location of each of the one or more transmitters.

In some examples, the DOA data also may correspond to transmissions emitted by third through $N^{th}$ transceivers of third through $N^{th}$ devices of the environment, N corresponding to a total number of transceivers of the environment. In some such examples, the DOA data also may correspond to transmissions received by each of the first through $N^{th}$ transceivers from all other transceivers of the environment. In some such examples, minimizing the cost function may involve estimating a position and/or an orientation of the third through $N^{th}$ transceivers.

International Publication No. WO 2021/127286 A1, entitled "Audio Device Auto-Location," which is hereby incorporated by reference, discloses methods for estimating audio device locations, listener positions and listener orientations in an audio environment. Some disclosed methods involve estimating audio device locations in an environment via direction of arrival (DOA) data and by determining interior angles for each of a plurality of triangles based on the DOA data. In some examples, each triangle has vertices that correspond with audio device locations. Some disclosed methods involve determining a side length for each side of each of the triangles and performing a forward alignment process of aligning each of the plurality of triangles to produce a forward alignment matrix. Some disclosed methods involve determining performing a reverse alignment process of aligning each of the plurality of triangles in a reverse sequence to produce a reverse alignment matrix. A final estimate of each audio device location may be based, at least in part, on values of the forward alignment matrix and values of the reverse alignment matrix.

Other disclosed methods of International Publication No. WO 2021/127286 A1 involve estimating a listener location and, in some instances, a listener location. Some such methods involve prompting the listener (e.g., via an audio prompt from one or more loudspeakers in the environment) to make one or more utterances and estimating the listener location according to DOA data. The DOA data may correspond to microphone data obtained by a plurality of microphones in the environment. The microphone data may correspond with detections of the one or more utterances by the microphones. At least some of the microphones may be co-located with loudspeakers. According to some examples, estimating a listener location may involve a triangulation process. Some such examples involve triangulating the user's voice by finding the point of intersection between DOA vectors passing through the audio devices. Some disclosed methods of determining a listener orientation involve prompting the user to identify a one or more loudspeaker locations. Some such examples involve prompting the user to identify one or more loudspeaker locations by moving next to the loudspeaker location(s) and making an utterance. Other examples involve prompting the user to identify one or more loudspeaker locations by pointing to each of the one or more loudspeaker locations with a handheld device, such as a cellular telephone that includes an inertial sensor system and a wireless interface configured for communicating with a control system that is controlling the audio devices of the audio environment (such as a control system of an orchestrating device). Some disclosed methods involve determining a listener orientation by causing loudspeakers to render an audio object such that the audio object seems to rotate around the listener, and prompting the listener to make an utterance (such as "Stop!") when the listener perceives the audio object to be in a location, such as a loudspeaker location, a television location, etc. Some disclosed methods involve determining a location and/or orientation of a listener via camera data, e.g., by determining a relative location of the listener and one or more audio devices of the audio environment according to the camera data, by determining an orientation of the listener relative to one or more audio devices of the audio environment according to the camera data (e.g., according to the direction that the listener is facing), etc.

In Shi, Guangi et al, *Spatial Calibration of Surround Sound Systems including Listener Position Estimation*, (AES 137$^{th}$ Convention, October 2014), which is hereby incorporated by reference, a system is described in which a single linear microphone array associated with a component of the reproduction system whose location is predictable, such as a soundbar a front center speaker, measures the time-difference-of-arrival (TDOA) for both satellite loudspeakers and a listener to locate the positions of both the loudspeakers and listener. In this case, the listening orientation is inherently defined as the line connecting the detected listening position and the component of the reproduction system that includes the linear microphone array, such as a sound bar that is co-located with a television (placed directly above or below the television). Because the sound bar's location is predictably placed directly above or below the video screen, the geometry of the measured distance and incident angle can be translated to an absolute position relative to any point in front of that reference sound bar location using simple trigonometric principles. The distance between a loudspeaker and a microphone of the linear microphone array can be estimated by playing a test signal and measuring the time of flight (TOF) between the emitting loudspeaker and the receiving microphone. The time delay of the direct component of a measured impulse response can be used for this purpose. The impulse response between the loudspeaker and a microphone array element can be obtained by playing a test signal through the loudspeaker under analysis. For example, either a maximum length sequence (MLS) or a chirp signal (also known as logarithmic sine sweep) can be used as the test signal. The room impulse response can be obtained by calculating the circular cross-correlation between the captured signal and the MLS input. FIG. 2 of this reference shows an echoic impulse response obtained using a MLS input. This impulse response is said to be similar to a measurement taken in a typical office or living room. The delay of the direct component is used to estimate the distance between the loudspeaker and the microphone array element. For loudspeaker distance estimation, any loopback latency of the audio device used to playback the test signal should be computed and removed from the measured TOF estimate.

Examples of Estimating the Location and Orientation of a Person in an Audio Environment The location and orientation of a person in an audio environment may be determined or estimated by various methods, including but not limited to those described in the following paragraphs.

In Hess, Wolfgang, *Head-Tracking Techniques for Virtual Acoustic Applications*, (AES 133rd Convention, October 2012), which is hereby incorporated by reference, numerous commercially available techniques for tracking both the position and orientation of a listener's head in the context of spatial audio reproduction systems are presented. One particular example discussed is the Microsoft Kinect. With its depth sensing and standard cameras along with a publicly available software (Windows Software Development Kit (SDK)), the positions and orientations of the heads of several listeners in a space can be simultaneously tracked using a combination of skeletal tracking and facial recognition. Although the Kinect for Windows has been discontinued, the Azure Kinect developer kit (DK), which implements the next generation of Microsoft's depth sensor, is currently available.

In U.S. Pat. No. 10,779,084, entitled "Automatic Discovery and Localization of Speaker Locations in Surround Sound Systems," which is hereby incorporated by reference, a system is described which can automatically locate the positions of loudspeakers and microphones in a listening environment by acoustically measuring the time-of-arrival (TOA) between each speaker and microphone. A listening position may be detected by placing and locating a microphone at a desired listening position (a microphone in a mobile phone held by the listener, for example), and an associated listening orientation may be defined by placing another microphone at a point in the viewing direction of the listener, e.g. at the TV. Alternatively, the listening orientation may be defined by locating a loudspeaker in the viewing direction, e.g. the loudspeakers on the TV.

International Publication No. WO 2021/127286 A1, entitled "Audio Device Auto-Location," which is hereby incorporated by reference, discloses methods for estimating audio device locations, listener positions and listener locations in an audio environment. Some disclosed methods involve estimating audio device locations in an environment via direction of arrival (DOA) data and by determining interior angles for each of a plurality of triangles based on the DOA data. In some examples, each triangle has vertices that correspond with audio device locations. Some disclosed methods involve determining a side length for each side of each of the triangles and performing a forward alignment process of aligning each of the plurality of triangles to produce a forward alignment matrix. Some disclosed methods involve determining performing a reverse alignment process of aligning each of the plurality of triangles in a reverse sequence to produce a reverse alignment matrix. A final estimate of each audio device location may be based, at least in part, on values of the forward alignment matrix and values of the reverse alignment matrix.

Other disclosed methods of International Publication No. WO 2021/127286 A1 involve estimating a listener location and, in some instances, a listener location. Some such methods involve prompting the listener (e.g., via an audio prompt from one or more loudspeakers in the environment) to make one or more utterances and estimating the listener location according to DOA data. The DOA data may correspond to microphone data obtained by a plurality of microphones in the environment. The microphone data may correspond with detections of the one or more utterances by the microphones. At least some of the microphones may be co-located with loudspeakers. According to some examples, estimating a listener location may involve a triangulation process. Some such examples involve triangulating the user's voice by finding the point of intersection between DOA vectors passing through the audio devices. Some disclosed methods of determining a listener orientation involve prompting the user to identify a one or more loudspeaker locations. Some such examples involve prompting the user to identify one or more loudspeaker locations by moving next to the loudspeaker location(s) and making an utterance. Other examples involve prompting the user to identify one or more loudspeaker locations by pointing to each of the one or more loudspeaker locations with a handheld device, such as a cellular telephone that includes an inertial sensor system and a wireless interface configured for communicating with a control system that is controlling the audio devices of the audio environment (such as a control system of an orchestrating device). Some disclosed methods involve determining a listener orientation by causing loudspeakers to render an audio object such that the audio object seems to rotate around the listener, and prompting the listener to make an utterance (such as "Stop!") when the listener perceives the audio object to be in a location, such as a loudspeaker location, a television location, etc. Some disclosed methods involve determining a location and/or orientation of a listener via camera data, e.g., by determining a relative location of the listener and one or more audio devices of the audio environment according to the camera data, by determining an orientation of the listener relative to one or more audio devices of the audio environment according to the camera data (e.g., according to the direction that the listener is facing), etc.

In Shi, Guangi et al, *Spatial Calibration of Surround Sound Systems including Listener Position Estimation*, (AES 137$^{th}$ Convention, October 2014), which is hereby incorporated by reference, a system is described in which a single linear microphone array associated with a component of the reproduction system whose location is predictable, such as a soundbar a front center speaker, measures the time-difference-of-arrival (TDOA) for both satellite loudspeakers and a listener to locate the positions of both the loudspeakers and listener. In this case, the listening orientation is inherently defined as the line connecting the detected listening position and the component of the reproduction system that includes the linear microphone array, such as a sound bar that is co-located with a television (placed directly above or below the television). Because the sound bar's location is predictably placed directly above or below the video screen, the geometry of the measured distance and incident angle can be translated to an absolute position relative to any point in front of that reference sound bar location using simple trigonometric principles. The distance between a loudspeaker and a microphone of the linear microphone array can be estimated by playing a test signal and measuring the time of flight (TOF) between the emitting loudspeaker and the receiving microphone. The time delay of the direct component of a measured impulse response can be used for this purpose. The impulse response between the loudspeaker and a microphone array element can be obtained by playing a test signal through the loudspeaker under analysis. For example, either a maximum length sequence (MLS) or a chirp signal (also known as logarithmic sine sweep) can be used as the test signal. The room impulse response can be obtained by calculating the circular cross-correlation between the captured signal and the MLS input. FIG. 2 of this reference shows an echoic impulse response obtained using a MLS input. This impulse response is said to be similar to a measurement taken in a typical office or living room. The delay of the direct component is used to estimate the distance between the loudspeaker and the microphone array element. For loudspeaker distance estimation, any loopback latency of the audio device used to playback the test signal should be computed and removed from the measured TOF estimate.

Further Examples of Audio Processing Changes That Involve Optimization of a Cost Function As noted elsewhere herein, in various disclosed examples one or more types of audio processing changes may be based on the optimization of a cost function. Some such examples involve flexible rendering.

Flexible rendering allows spatial audio to be rendered over an arbitrary number of arbitrarily placed speakers. In view of the widespread deployment of audio devices, including but not limited to smart audio devices (e.g., smart speakers) in the home, there is a need for realizing flexible rendering technology that allows consumer products to perform flexible rendering of audio, and playback of the so-rendered audio.

Several technologies have been developed to implement flexible rendering. They cast the rendering problem as one of cost function minimization, where the cost function consists of two terms: a first term that models the desired spatial impression that the renderer is trying to achieve, and a second term that assigns a cost to activating speakers. To date this second term has focused on creating a sparse solution where only speakers in close proximity to the desired spatial position of the audio being rendered are activated.

Playback of spatial audio in a consumer environment has typically been tied to a prescribed number of loudspeakers placed in prescribed positions: for example, 5.1 and 7.1 surround sound. In these cases, content is authored specifically for the associated loudspeakers and encoded as discrete channels, one for each loudspeaker (e.g., Dolby Digital, or Dolby Digital Plus, etc.) More recently, immersive, object-based spatial audio formats have been introduced (Dolby Atmos) which break this association between the content and specific loudspeaker locations. Instead, the content may be described as a collection of individual audio objects, each with possibly time varying metadata describing the desired perceived location of said audio objects in three-dimensional space. At playback time, the content is transformed into loudspeaker feeds by a renderer which adapts to the number and location of loudspeakers in the playback system. Many such renderers, however, still constrain the locations of the set of loudspeakers to be one of a set of prescribed layouts (for example 3.1.2, 5.1.2, 7.1.4, 9.1.6, etc. with Dolby Atmos).

Moving beyond such constrained rendering, methods have been developed which allow object-based audio to be rendered flexibly over a truly arbitrary number of loudspeakers placed at arbitrary positions. These methods require that the renderer have knowledge of the number and physical locations of the loudspeakers in the listening space. For such a system to be practical for the average consumer, an automated method for locating the loudspeakers would be desirable. One such method relies on the use of a multitude of microphones, possibly co-located with the loudspeakers. By playing audio signals through the loudspeakers and recording with the microphones, the distance between each loudspeaker and microphone is estimated. From these distances the locations of both the loudspeakers and microphones are subsequently deduced.

Simultaneous to the introduction of object-based spatial audio in the consumer space has been the rapid adoption of so-called "smart speakers", such as the Amazon Echo line of products. The tremendous popularity of these devices can be attributed to their simplicity and convenience afforded by wireless connectivity and an integrated voice interface (Amazon's Alexa, for example), but the sonic capabilities of these devices has generally been limited, particularly with respect to spatial audio. In most cases these devices are constrained to mono or stereo playback. However, combining the aforementioned flexible rendering and auto-location technologies with a plurality of orchestrated smart speakers may yield a system with very sophisticated spatial playback capabilities and that still remains extremely simple for the consumer to set up. A consumer can place as many or few of the speakers as desired, wherever is convenient, without the need to run speaker wires due to the wireless connectivity, and the built-in microphones can be used to automatically locate the speakers for the associated flexible renderer.

Conventional flexible rendering algorithms are designed to achieve a particular desired perceived spatial impression as closely as possible. In a system of orchestrated smart speakers, at times, maintenance of this spatial impression may not be the most important or desired objective. For example, if someone is simultaneously attempting to speak to an integrated voice assistant, it may be desirable to momentarily alter the spatial rendering in a manner that reduces the relative playback levels on speakers near certain microphones in order to increase the signal to noise ratio and/or the signal to echo ratio (SER) of microphone signals that include the detected speech. Some embodiments described herein may be implemented as modifications to existing flexible rendering methods, to allow such dynamic modification to spatial rendering, e.g., for the purpose of achieving one or more additional objectives.

Existing flexible rendering techniques include Center of Mass Amplitude Panning (CMAP) and Flexible Virtualization (FV). From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers. The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship is conveniently derived from a cost function written as the sum of two terms, one for the spatial aspect and one for proximity:

$$C(g) = C_{spatial}(g, \vec{o}, \{\vec{s}_i\}) + C_{proximity}(g, \vec{o}, \{\vec{s}_i\}) \tag{8}$$

Here, the set $\{\vec{s}_i\}$ denotes the positions of a set of M loudspeakers, $\vec{o}$ denotes the desired perceived spatial position of the audio signal, and g denotes an M dimensional vector of speaker activations. For CMAP, each activation in the vector represents a gain per speaker, while for FV each activation represents a filter (in this second case g can equivalently be considered a vector of complex values at a particular frequency and a different g is computed across a plurality of frequencies to form the filter). The optimal vector of activations is found by minimizing the cost function across activations:

$$g_{opt} = \min_g C(g, \vec{o}, \{\vec{s}_i\})$$

With certain definitions of the cost function, it is difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with a commonly used constant power panning rules:

$$\bar{g}_{opt} = \frac{g_{opt}}{\|g_{opt}\|}$$

The exact behavior of the flexible rendering algorithm is dictated by the particular construction of the two terms of the cost function, $C_{spatial}$ and $C_{proximity}$. For CMAP, $C_{spatial}$ is derived from a model that places the perceived spatial position of an audio signal playing from a set of loudspeakers at the center of mass of those loudspeakers' positions weighted by their associated activating gains $g_i$ (elements of the vector g):

$$\vec{o}=\frac{\sum_{i=1}^{M} g_i \vec{s}_i}{\sum_{i=1}^{M} g_i} \tag{10}$$

Equation 10 is then manipulated into a spatial cost representing the squared error between the desired audio position and that produced by the activated loudspeakers:

$$C_{spatial}(g, \vec{o}, \{\vec{s}_i\}) = \left\|\left(\sum_{i=1}^{M} g_i\right)\vec{o} - \sum_{i=1}^{M} g_i \vec{s}_i\right\|^2 = \left\|\sum_{i=1}^{M} g_i(\vec{o}-\vec{s}_i)\right\|^2 \tag{11}$$

With FV, the spatial term of the cost function is defined differently. There the goal is to produce a binaural response b corresponding to the audio object position $\vec{o}$ at the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs indexed by object position:

$$b = HRTF\{\vec{o}\} \tag{12}$$

At the same time, the 2×1 binaural response e produced at the listener's ears by the loudspeakers is modelled as a 2×M acoustic transmission matrix H multiplied with the M×1 vector g of complex speaker activation values:

$$e = Hg \tag{13}$$

The acoustic transmission matrix H is modelled based on the set of loudspeaker positions $\{\vec{s}_i\}$ with respect to the listener position. Finally, the spatial component of the cost function is defined as the squared error between the desired binaural response (Equation 12) and that produced by the loudspeakers (Equation 13):

$$C_{spatial}(g, \vec{o}, \{\vec{s}_i\}) = (b - Hg)*(b - Hg) \tag{14}$$

Conveniently, the spatial term of the cost function for CMAP and FV defined in Equations 11 and 14 can both be rearranged into a matrix quadratic as a function of speaker activations g:

$$C_{spatial}(g, \vec{o}, \{\vec{s}_i\}) = g*Ag + Bg + C \tag{15}$$

where A is an M×M square matrix, B is a 1×M vector, and C is a scalar. The matrix A is of rank 2, and therefore whenM>2 there exist an infinite number of speaker activations g for which the spatial error term equals zero. Introducing the second term of the cost function, $C_{proximity}$, removes this indeterminacy and results in a particular solution with perceptually beneficial properties in comparison to the other possible solutions. For both CMAP and FV, $C_{proximity}$ is constructed such that activation of speakers whose position $\vec{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that is perceptually more robust to listener movement around the set of speakers.

To this end, the second term of the cost function, $C_{proximity}$, may be defined as a distance-weighted sum of the absolute values squared of speaker activations. This is represented compactly in matrix form as:

$$C_{proximity}(g, \vec{o}, \{\vec{s}_i\}) = g*Dg \tag{16a}$$

where D is a diagonal matrix of distance penalties between the desired audio position and each speaker:

$$D=\begin{bmatrix} d_1 & \ldots & 0 \\ \vdots & \ddots & \vdots \\ 0 & \ldots & d_M \end{bmatrix},\ d_i = \text{distance}(\vec{o}, \vec{s}_i) \tag{16b}$$

The distance penalty function can take on many forms, but the following is a useful parameterization $$\text{distance}(\vec{o}, \vec{s}_i) = \alpha d_0^2\left(\frac{\|\vec{o}-\vec{s}_i\|}{d_0}\right)^{\beta} \tag{16c}$$

where $\|\vec{o}-\vec{s}_i\|$ is the Euclidean distance between the desired audio position and speaker position and α and β are tunable parameters. The parameter α indicates the global strength of the penalty; $d_0$ corresponds to the spatial extent of the distance penalty (loudspeakers at a distance around $d_0$ or further away will be penalized), and β accounts for the abruptness of the onset of the penalty at distance $d_0$.

Combining the two terms of the cost function defined in Equations 15 and 16a yields the overall cost function $$C(g) = g*Ag + Bg + C + g*Dg = g*(A+D)g + Bg + C \tag{17}$$

Setting the derivative of this cost function with respect to g equal to zero and solving for g yields the optimal speaker activation solution:

$$g_{opt} = \frac{1}{2}(A+D)^{-1}B \tag{18}$$

In general, the optimal solution in Equation 18 may yield speaker activations that are negative in value. For the CMAP construction of the flexible renderer, such negative activations may not be desirable, and thus Equation 18 may be minimized subject to all activations remaining positive.

Figure 15:
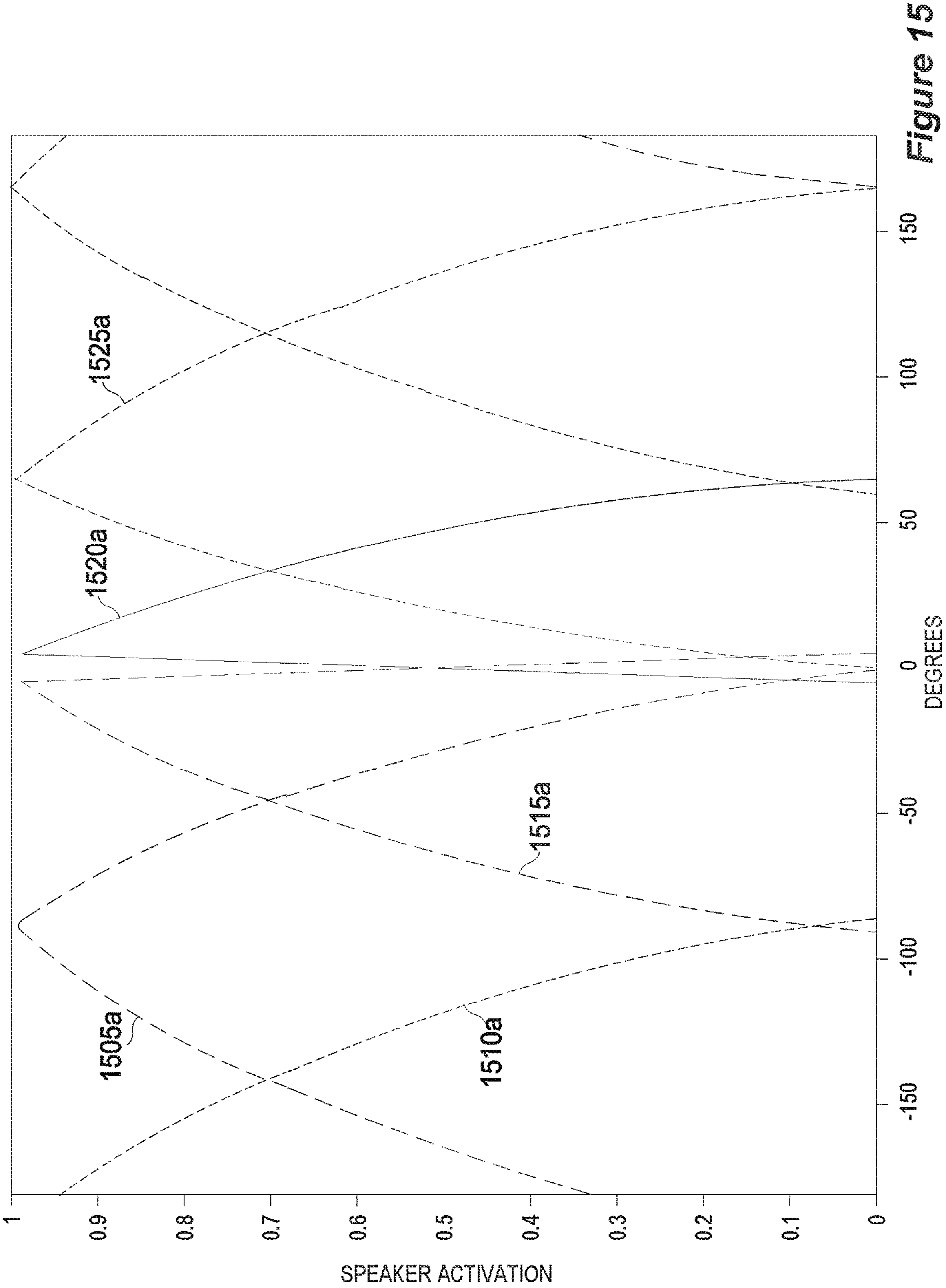
FIGS. 15 and 16 are diagrams which illustrate an example set of speaker activations and object rendering positions.
Figure 16:
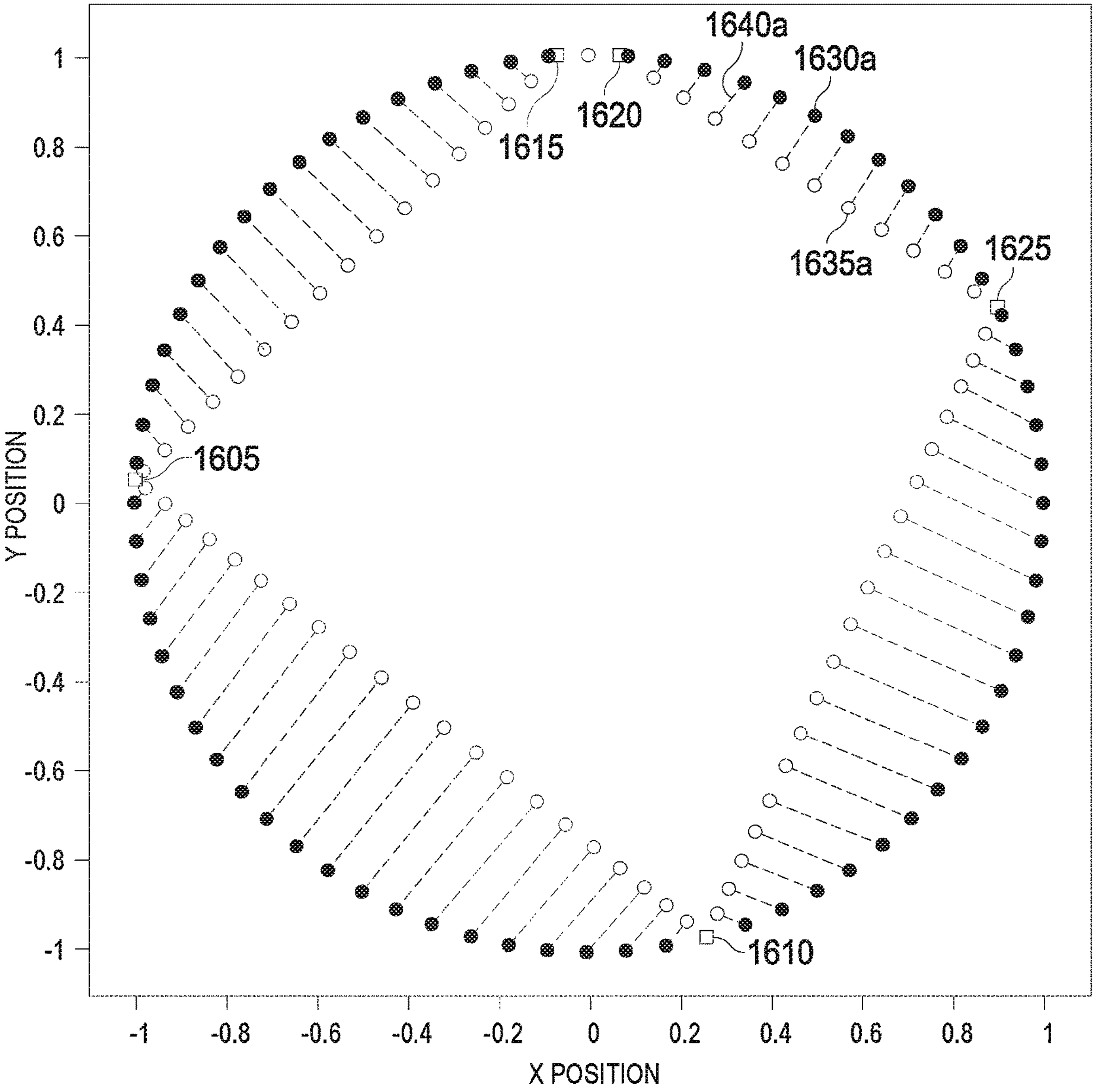

FIGS. 15 and 16 are diagrams which illustrate an example set of speaker activations and object rendering positions. In these examples, the speaker activations and object rendering positions correspond to speaker positions of 4, 64, 165, −87, and −4 degrees. FIG. 15 shows the speaker activations 1505$a$, 1510$a$, 1515$a$, 1520$a$ and 1525$a$, which comprise the optimal solution to Equation 11 for these particular speaker positions. FIG. 16 plots the individual speaker positions as dots 1605, 1610, 1615, 1620 and 1625, which correspond to speaker activations 1505$a$, 1510$a$, 1515$a$, 1520$a$ and 1525$a$, respectively. FIG. 16 also shows ideal object positions (in other words, positions at which audio objects are to be rendered) for a multitude of possible object angles as dots 1630$a$ and the corresponding actual rendering positions for those objects as dots 1635$a$, connected to the ideal object positions by dotted lines 1640$a$.

A class of embodiments involves methods for rendering audio for playback by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering (in accordance with an embodiment) of audio for playback by all or some (i.e., by speaker(s) of all or some) of the smart audio devices. Many interactions with the system are contemplated which require dynamic modifications to the rendering. Such modifications may be, but are not necessarily, focused on spatial fidelity.

Some embodiments are methods for rendering of audio for playback by at least one (e.g., all or some) of the smart audio devices of a set of smart audio devices (or for playback by at least one (e.g., all or some) of the speakers of another set of speakers). The rendering may include minimization of a cost function, where the cost function includes at least one dynamic speaker activation term. Examples of such a dynamic speaker activation term include (but are not limited to):

- Proximity of speakers to one or more listeners;
- Proximity of speakers to an attracting or repelling force;
- Audibility of the speakers with respect to some location (e.g., listener position, or baby room);
- Capability of the speakers (e.g., frequency response and distortion);
- Synchronization of the speakers with respect to other speakers;
- Wakeword performance; and
- Echo canceller performance.

The dynamic speaker activation term(s) may enable at least one of a variety of behaviors, including warping the spatial presentation of the audio away from a particular smart audio device so that its microphone can better hear a talker or so that a secondary audio stream may be better heard from speaker(s) of the smart audio device.

Some embodiments implement rendering for playback by speaker(s) of a plurality of smart audio devices that are coordinated (orchestrated). Other embodiments implement rendering for playback by speaker(s) of another set of speakers.

Pairing flexible rendering methods (implemented in accordance with some embodiments) with a set of wireless smart speakers (or other smart audio devices) can yield an extremely capable and easy-to-use spatial audio rendering system. In contemplating interactions with such a system it becomes evident that dynamic modifications to the spatial rendering may be desirable in order to optimize for other objectives that may arise during the system's use. To achieve this goal, a class of embodiments augment existing flexible rendering algorithms (in which speaker activation is a function of the previously disclosed spatial and proximity terms), with one or more additional dynamically configurable functions dependent on one or more properties of the audio signals being rendered, the set of speakers, and/or other external inputs. In accordance with some embodiments, the cost function of the existing flexible rendering given in Equation 1 is augmented with these one or more additional dependencies according to $$C(g) = C_{spatial}(g, \vec{o}, \{\vec{s}_i\}) + C_{proximity}(g, \vec{o}, \{\vec{s}_i\}) + \Sigma_j C_j\left(g, \{\{\hat{o}\}, \{\hat{s}_i\}, \{\hat{e}\}\}_j\right) \tag{19}$$

Equation 19 corresponds with Equation 1, above. Accordingly, the preceding discussion explains the derivation of Equation 1 as well as that of Equation 19.

In Equation 19, the terms $C_j(g, \{\{\hat{o}\}, \{\hat{s}_i\}, \{\hat{e}\}\}_j)$ represent additional cost terms, with $\{\hat{o}\}$ representing a set of one or more properties of the audio signals (e.g., of an object-based audio program) being rendered, $\{\hat{s}_i\}$ representing a set of one or more properties of the speakers over which the audio is being rendered, and $\{\hat{e}\}$ representing one or more additional external inputs. Each term $C_j(g, \{\{\hat{o}\}, \{\hat{s}_i\}, \{\hat{e}\}\}_j)$ returns a cost as a function of activations g in relation to a combination of one or more properties of the audio signals, speakers, and/or external inputs, represented generically by the set $\{\{\hat{o}\}, \{\hat{s}_i\}, \{\hat{e}\}\}_j$. It should be appreciated that the set $\{\{\hat{o}\}, \{\hat{s}_i\}, \{\hat{e}\}\}_j$ contains at a minimum only one element from any of $\{\hat{o}\}$, $\{\hat{s}_i\}$, or $\{\hat{e}\}$.

Examples of $\{\hat{o}\}$ include but are not limited to:

- Desired perceived spatial position of the audio signal;
- Level (possible time-varying) of the audio signal; and/or
- Spectrum (possibly time-varying) of the audio signal.

Examples of $\{\hat{s}_i\}$ Include but are not Limited to:

- Locations of the loudspeakers in the listening space;
- Frequency response of the loudspeakers;
- Playback level limits of the loudspeakers;
- Parameters of dynamics processing algorithms within the speakers, such as limiter gains;
- A measurement or estimate of acoustic transmission from each speaker to the others;
- A measure of echo canceller performance on the speakers; and/or
- Relative synchronization of the speakers with respect to each other.

Examples of $\{\hat{e}\}$ Include but are not Limited to:

- Locations of one or more listeners or talkers in the playback space;
- A measurement or estimate of acoustic transmission from each loudspeaker to the listening location;
- A measurement or estimate of the acoustic transmission from a talker to the set of loudspeakers;
- Location of some other landmark in the playback space; and/or
- A measurement or estimate of acoustic transmission from each speaker to some other landmark in the playback space;

With the new cost function defined in Equation 28, an optimal set of activations may be found through minimization with respect to g and possible post-normalization as previously specified in Equations 28a and 28b.

Figure 17:
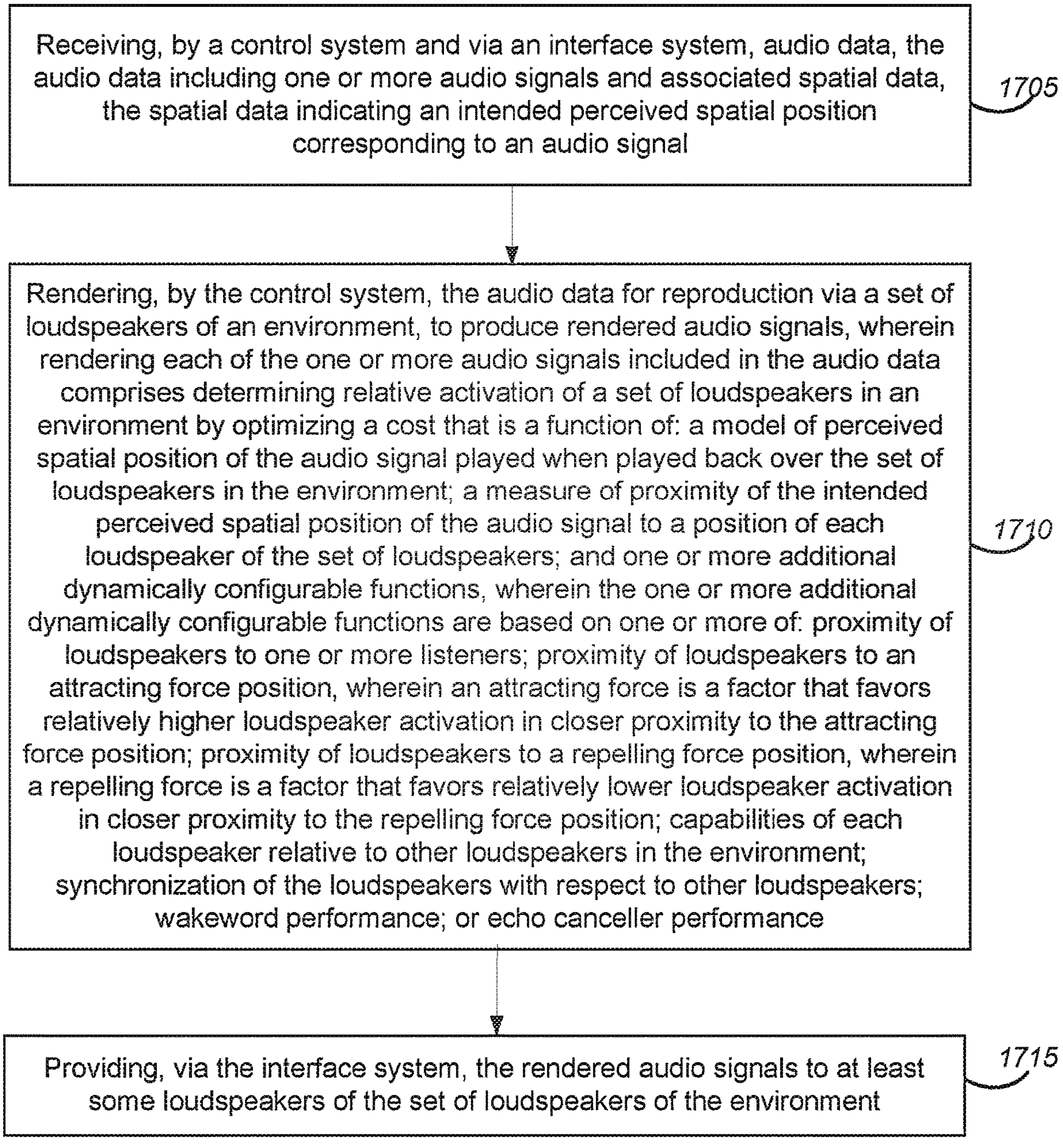
FIG. 17 is a flow diagram that outlines one example of a method that may be performed by an apparatus or system such as that shown in FIG. 1.

FIG. 17 is a flow diagram that outlines one example of a method that may be performed by an apparatus or system such as that shown in FIG. 1. The blocks of method 1700, like other methods described herein, are not necessarily performed in the order indicated. Moreover, such methods may include more or fewer blocks than shown and/or described. The blocks of method 1700 may be performed by one or more devices, which may be (or may include) a control system such as the control system 160 shown in FIG. 1.

In this implementation, block 1705 involves receiving, by a control system and via an interface system, audio data. In this example, the audio data includes one or more audio signals and associated spatial data. According to this implementation, the spatial data indicates an intended perceived spatial position corresponding to an audio signal. In some instances, the intended perceived spatial position may be explicit, e.g., as indicated by positional metadata such as Dolby Atmos positional metadata. In other instances, the intended perceived spatial position may be implicit, e.g., the intended perceived spatial position may be an assumed location associated with a channel according to Dolby 5.1, Dolby 7.1, or another channel-based audio format. In some examples, block 1705 involves a rendering module of a control system receiving, via an interface system, the audio data.

According to this example, block 1710 involves rendering, by the control system, the audio data for reproduction via a set of loudspeakers of an environment, to produce rendered audio signals. In this example, rendering each of the one or more audio signals included in the audio data involves determining relative activation of a set of loudspeakers in an environment by optimizing a cost function. According to this example, the cost is a function of a model of perceived spatial position of the audio signal when played back over the set of loudspeakers in the environment. In this example, the cost is also a function of a measure of proximity of the intended perceived spatial position of the audio signal to a position of each loudspeaker of the set of loudspeakers. In this implementation, the cost is also a function of one or more additional dynamically configurable functions. In this example, the dynamically configurable functions are based on one or more of the following: proximity of loudspeakers to one or more listeners; proximity of loudspeakers to an attracting force position, wherein an attracting force is a factor that favors relatively higher loudspeaker activation in closer proximity to the attracting force position; proximity of loudspeakers to a repelling force position, wherein a repelling force is a factor that favors relatively lower loudspeaker activation in closer proximity to the repelling force position; capabilities of each loudspeaker relative to other loudspeakers in the environment; synchronization of the loudspeakers with respect to other loudspeakers; wakeword performance; or echo canceller performance.

In this example, block 1715 involves providing, via the interface system, the rendered audio signals to at least some loudspeakers of the set of loudspeakers of the environment.

According to some examples, the model of perceived spatial position may produce a binaural response corresponding to an audio object position at the left and right ears of a listener. Alternatively, or additionally, the model of perceived spatial position may place the perceived spatial position of an audio signal playing from a set of loudspeakers at a center of mass of the set of loudspeakers' positions weighted by the loudspeaker's associated activating gains.

In some examples, the one or more additional dynamically configurable functions may be based, at least in part, on a level of the one or more audio signals. In some instances, the one or more additional dynamically configurable functions may be based, at least in part, on a spectrum of the one or more audio signals.

Some examples of the method 1700 involve receiving loudspeaker layout information. In some examples, the one or more additional dynamically configurable functions may be based, at least in part, on a location of each of the loudspeakers in the environment.

Some examples of the method 1700 involve receiving loudspeaker specification information. In some examples, the one or more additional dynamically configurable functions may be based, at least in part, on the capabilities of each loudspeaker, which may include one or more of frequency response, playback level limits or parameters of one or more loudspeaker dynamics processing algorithms.

According to some examples, the one or more additional dynamically configurable functions may be based, at least in part, on a measurement or estimate of acoustic transmission from each loudspeaker to the other loudspeakers. Alternatively, or additionally, the one or more additional dynamically configurable functions may be based, at least in part, on a listener or speaker location of one or more people in the environment. Alternatively, or additionally, the one or more additional dynamically configurable functions may be based, at least in part, on a measurement or estimate of acoustic transmission from each loudspeaker to the listener or speaker location. An estimate of acoustic transmission may, for example be based at least in part on walls, furniture or other objects that may reside between each loudspeaker and the listener or speaker location.

Alternatively, or additionally, the one or more additional dynamically configurable functions may be based, at least in part, on an object location of one or more non-loudspeaker objects or landmarks in the environment. In some such implementations, the one or more additional dynamically configurable functions may be based, at least in part, on a measurement or estimate of acoustic transmission from each loudspeaker to the object location or landmark location.

Numerous new and useful behaviors may be achieved by employing one or more appropriately defined additional cost terms to implement flexible rendering. All example behaviors listed below are cast in terms of penalizing certain loudspeakers under certain conditions deemed undesirable. The end result is that these loudspeakers are activated less in the spatial rendering of the set of audio signals. In many of these cases, one might contemplate simply turning down the undesirable loudspeakers independently of any modification to the spatial rendering, but such a strategy may significantly degrade the overall balance of the audio content. Certain components of the mix may become completely inaudible, for example. With the disclosed embodiments, on the other hand, integration of these penalizations into the core optimization of the rendering allows the rendering to adapt and perform the best possible spatial rendering with the remaining less-penalized speakers. This is a much more elegant, adaptable, and effective solution.

Example use cases include, but are not limited to:

- Providing a more balanced spatial presentation around the listening area
  - It has been found that spatial audio is best presented across loudspeakers that are roughly the same distance from the intended listening area. A cost may be constructed such that loudspeakers that are significantly closer or further away than the mean distance of loudspeakers to the listening area are penalized, thus reducing their activation;
- Moving audio away from or towards a listener or talker
  - If a user of the system is attempting to speak to a smart voice assistant of or associated with the system, it may be beneficial to create a cost which penalizes loudspeakers closer to the talker. This way, these loudspeakers are activated less, allowing their associated microphones to better hear the talker;

To provide a more intimate experience for a single listener that minimizes playback levels for others in the listening space, speakers far from the listener's location may be penalized heavily so that only speakers closest to the listener are activated most significantly;

Moving audio away from or towards a landmark, zone or area

Certain locations in the vicinity of the listening space may be considered sensitive, such as a baby's room, a baby's bed, an office, a reading area, a study area, etc. In such a case, a cost may be constructed the penalizes the use of speakers close to this location, zone or area;

Alternatively, for the same case above (or similar cases), the system of speakers may have generated measurements of acoustic transmission from each speaker into the baby's room, particularly if one of the speakers (with an attached or associated microphone) resides within the baby's room itself. In this case, rather than using physical proximity of the speakers to the baby's room, a cost may be constructed that penalizes the use of speakers whose measured acoustic transmission into the room is high; and/or Optimal use of the speakers' capabilities The capabilities of different loudspeakers can vary significantly. For example, one popular smart speaker contains only a single 1.6" full range driver with limited low frequency capability. On the other hand, another smart speaker contains a much more capable 3" woofer. These capabilities are generally reflected in the frequency response of a speaker, and as such, the set of responses associated with the speakers may be utilized in a cost term. At a particular frequency, speakers that are less capable relative to the others, as measured by their frequency response, may be penalized and therefore activated to a lesser degree. In some implementations, such frequency response values may be stored with a smart loudspeaker and then reported to the computational unit responsible for optimizing the flexible rendering;

Many speakers contain more than one driver, each responsible for playing a different frequency range. For example, one popular smart speaker is a two-way design containing a woofer for lower frequencies and a tweeter for higher frequencies. Typically, such a speaker contains a crossover circuit to divide the full-range playback audio signal into the appropriate frequency ranges and send to the respective drivers. Alternatively, such a speaker may provide the flexible renderer playback access to each individual driver as well as information about the capabilities of each individual driver, such as frequency response. By applying a cost term such as that described just above, in some examples the flexible renderer may automatically build a crossover between the two drivers based on their relative capabilities at different frequencies;

The above-described example uses of frequency response focus on the inherent capabilities of the speakers but may not accurately reflect the capability of the speakers as placed in the listening environment. In certain cases, the frequencies responses of the speakers as measured in the intended listening position may be available through some calibration procedure. Such measurements may be used instead of precomputed responses to better optimize use of the speakers. For example, a certain speaker may be inherently very capable at a particular frequency, but because of its placement (behind a wall or a piece of furniture for example) might produce a very limited response at the intended listening position. A measurement that captures this response and is fed into an appropriate cost term can prevent significant activation of such a speaker;

Frequency response is only one aspect of a loudspeaker's playback capabilities. Many smaller loudspeakers start to distort and then hit their excursion limit as playback level increases, particularly for lower frequencies. To reduce such distortion many loudspeakers implement dynamics processing which constrains the playback level below some limit thresholds that may be variable across frequency. In cases where a speaker is near or at these thresholds, while others participating in flexible rendering are not, it makes sense to reduce signal level in the limiting speaker and divert this energy to other less taxed speakers. Such behavior can be automatically achieved in accordance with some embodiments by properly configuring an associated cost term. Such a cost term may involve one or more of the following:

Monitoring a global playback volume in relation to the limit thresholds of the loudspeakers. For example, a loudspeaker for which the volume level is closer to its limit threshold may be penalized more;

Monitoring dynamic signals levels, possibly varying across frequency, in relationship to loudspeaker limit thresholds, also possibly varying across frequency. For example, a loudspeaker for which the monitored signal level is closer to its limit thresholds may be penalized more;

Monitoring parameters of the loudspeakers' dynamics processing directly, such as limiting gains. In some such examples, a loudspeaker for which the parameters indicate more limiting may be penalized more; and/or Monitoring the actual instantaneous voltage, current, and power being delivered by an amplifier to a loudspeaker to determine if the loudspeaker is operating in a linear range. For example, a loudspeaker which is operating less linearly may be penalized more;

Smart speakers with integrated microphones and an interactive voice assistant typically employ some type of echo cancellation to reduce the level of audio signal playing out of the speaker as picked up by the recording microphone. The greater this reduction, the better chance the speaker has of hearing and understanding a talker in the space. If the residual of the echo canceller is consistently high, this may be an indication that the speaker is being driven into a non-linear region where prediction of the echo path becomes challenging. In such a case it may make sense to divert signal energy away from the speaker, and as such, a cost term taking into account echo canceller performance may be beneficial. Such a cost term may assign a high cost to a speaker for which its associated echo canceller is performing poorly;

In order to achieve predictable imaging when rendering spatial audio over multiple loudspeakers, it is generally required that playback over the set of loudspeakers be reasonably synchronized across time. For wired loudspeakers this is a given, but with a multitude of wireless loudspeakers synchronization may be challenging and the end-result variable. In such a case it may be possible for each loudspeaker to report its relative degree of synchronization with a target, and this degree may then feed into a synchronization cost term. In some such examples, loudspeakers with a lower degree of synchronization may be penalized more and therefore excluded from rendering. Additionally, tight synchronization may not be required for certain types of audio signals, for example components of the audio mix intended to be diffuse or non-directional. In some implementations, components may be tagged as such with metadata and a synchronization cost term may be modified such that the penalization is reduced.

We next describe additional examples of embodiments. Similar to the proximity cost defined in Equations 25a and 25b, it may also be convenient to express each of the new cost function terms $C_j(g, \{\{\hat{o}\}, \{\hat{s}_i\}, \{\hat{e}\}\}_j)$ as a weighted sum of the absolute values squared of speaker activations, e.g. as follows:

$$C_j(g, \{\{\hat{o}\}, \{\hat{s}_i\}, \{\hat{e}\}\}_j) = g * W_j(\{\{\hat{o}\}, \{\hat{s}_i\}, \{\hat{e}\}\}_j)g, \tag{20a}$$

where $W_j$ is a diagonal matrix of weights $w_{ij}=w_{ij}(\{\{\hat{o}\}, \{\hat{s}_i\}, \{\hat{e}\}\}_j)$describing the cost associated with activating speaker i for the term j:

$$W_j = \begin{bmatrix} w_{1j} & \dots & 0 \\ \vdots & \ddots & \vdots \\ 0 & \dots & w_{Mj} \end{bmatrix} \tag{20b}$$

Equation 20b corresponds with Equation 3, above.

Combining Equations 20a and 20b with the matrix quadratic version of the CMAP and FV cost functions given in Equation 15 yields a potentially beneficial implementation of the general expanded cost function (of some embodiments) given in Equation 19:

$$C(g) = g*Ag + Bg + C + g*Dg + \sum_j g*W_jg = g*\left(A + D + \sum_j W_j\right)g + Bg + C \tag{21}$$

Equation 21 corresponds with Equation 2, above. Accordingly, the preceding discussion explains the derivation of Equation 2 as well as that of Equation 21.

With this definition of the new cost function terms, the overall cost function remains a matrix quadratic, and the optimal set of activations $g_{opt}$ can be found through differentiation of Equation 21 to yield $$g_{opt} = \frac{1}{2}\left(A + D + \sum_j W_j\right)^{-1} B \tag{22}$$

It is useful to consider each one of the weight terms $w_{ij}$ as functions of a given continuous penalty value $p_{ij}=p_{ij}(\{\{\hat{o}\}, \{\hat{s}_i\}, \{\hat{e}\}\}_j)$ for each one of the loudspeakers. In one example embodiment, this penalty value is the distance from the object (to be rendered) to the loudspeaker considered. In another example embodiment, this penalty value represents the inability of the given loudspeaker to reproduce some frequencies. Based on this penalty value, the weight terms $w_{ij}$ can be parametrized as:

$$w_{ij} = \alpha_j f_j\left(\frac{p_{ij}}{\tau_j}\right) \tag{23}$$

where $\alpha_j$ represents a pre-factor (which takes into account the global intensity of the weight term), where $\tau_j$ represents a penalty threshold (around or beyond which the weight term becomes significant), and where $f_j(x)$ represents a monotonically increasing function. For example, with $f_j(x)=x^{\beta_j}$ the weight term has the form:

$$w_{ij} = \alpha_j\left(\frac{p_{ij}}{\tau_j}\right)^{\beta_j} \tag{24}$$

where $\alpha_j$, $\beta_j$, $\tau_j$ are tunable parameters which respectively indicate the global strength of the penalty, the abruptness of the onset of the penalty and the extent of the penalty. Care should be taken in setting these tunable values so that the relative effect of the cost term $C_j$ with respect any other additional cost terms as well as $C_{spatial}$ and $C_{proximity}$ is appropriate for achieving the desired outcome. For example, as a rule of thumb, if one desires a particular penalty to clearly dominate the others then setting its intensity $\alpha_j$ roughly ten times larger than the next largest penalty intensity may be appropriate.

In case all loudspeakers are penalized, it is often convenient to subtract the minimum penalty from all weight terms in post-processing so that at least one of the speakers is not penalized:

$$w_{ij} \rightarrow w'_{ij} = w_{ij} - \min_i(w_{ij}) \tag{25}$$

As stated above, there are many possible use cases that can be realized using the new cost function terms described herein (and similar new cost function terms employed in accordance with other embodiments). Next, we describe more concrete details with three examples: moving audio towards a listener or talker, moving audio away from a listener or talker, and moving audio away from a landmark.

In the first example, what will be referred to herein as an "attracting force" is used to pull audio towards a position, which in some examples may be the position of a listener or a talker a landmark position, a furniture position, etc. The position may be referred to herein as an "attracting force position" or an "attractor location." As used herein an "attracting force" is a factor that favors relatively higher loudspeaker activation in closer proximity to an attracting force position. According to this example, the weight $w_{ij}$ takes the form of equation 17 with the continuous penalty value $p_{ij}$ given by the distance of the ith speaker from a fixed attractor location $\vec{l}_j$ and the threshold value $\tau_j$ given by the maximum of these distances across all speakers:

$$p_{ij} = \left\|\vec{l}_j - \vec{s}_i\right\|, \text{ and} \tag{26a}$$

$$\tau_j = \max_i\left\|\vec{l}_j - \vec{s}_i\right\| \tag{26b}$$

Figure 18:
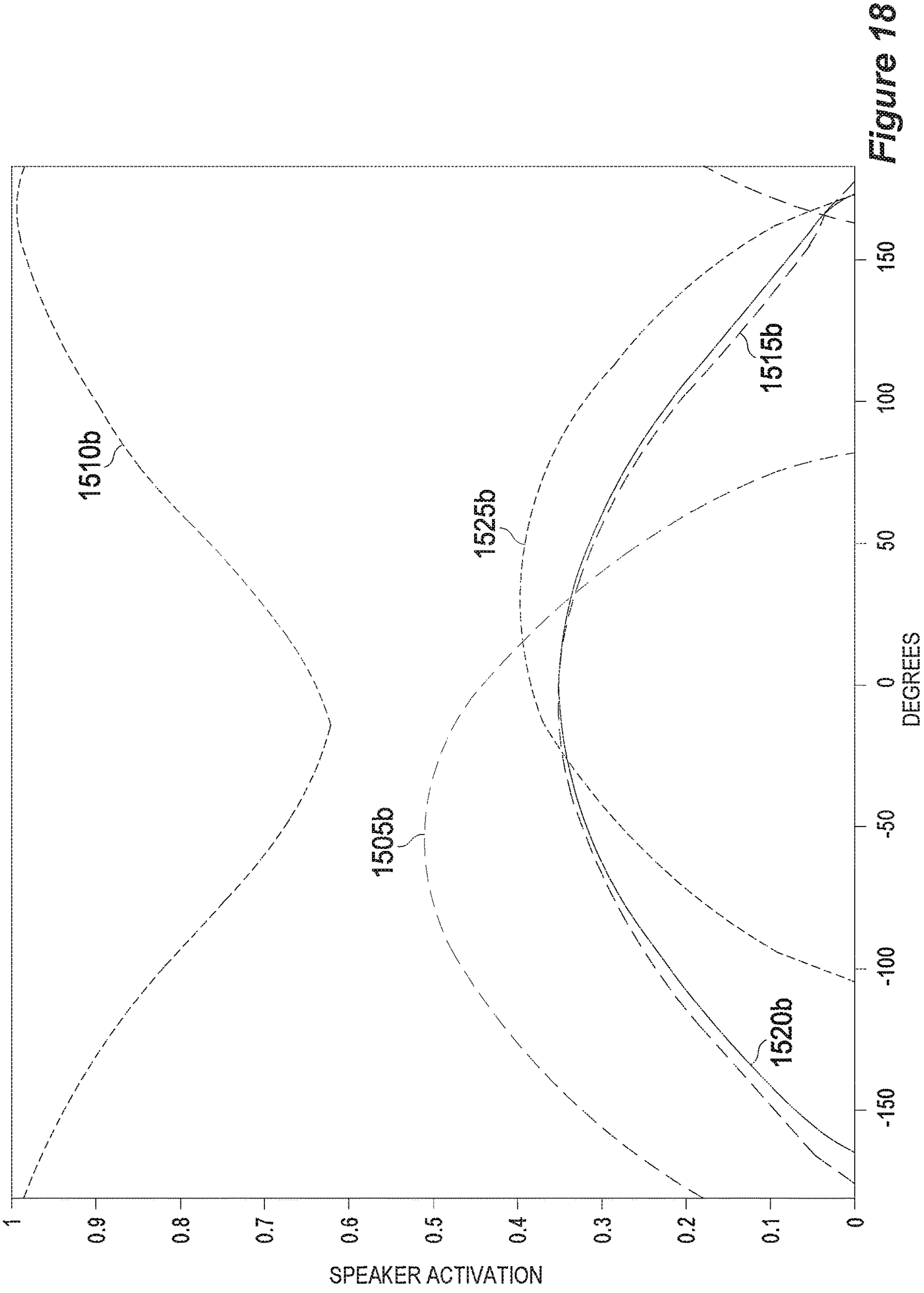
FIG. 18 is a graph of speaker activations in an example embodiment.
Figure 19:
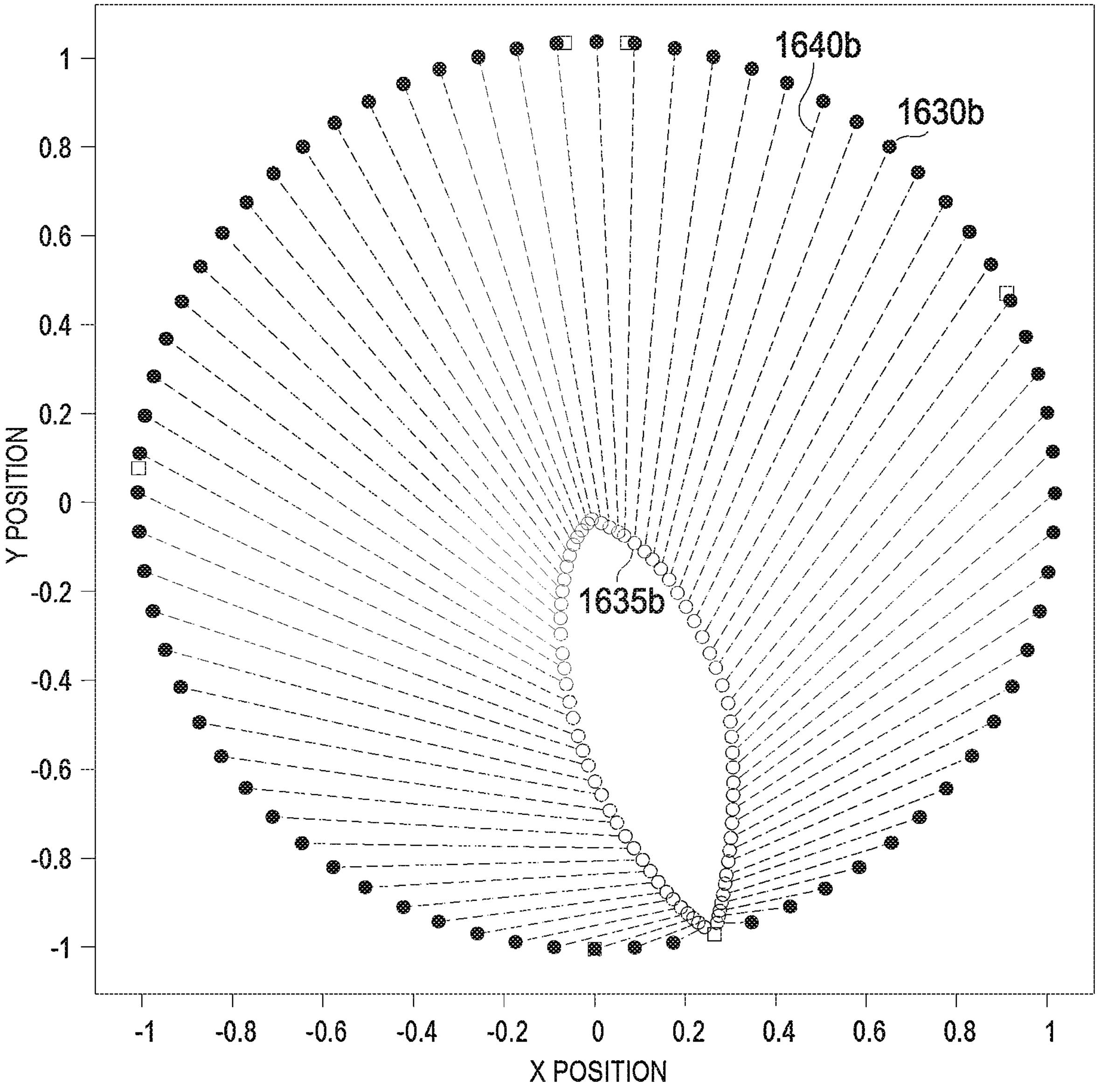
FIG. 19 is a graph of object rendering positions in an example embodiment.

To illustrate the use case of "pulling" audio towards a listener or talker, we specifically set $\alpha_j$=20, $\beta_j$=3, and $\vec{l}_j$ to a vector corresponding to a listener/talker position of 180 degrees (bottom, center of the plot). These values of $\alpha_j$, $\beta_j$, and $\vec{l}_j$ are merely examples. In some implementations, $\alpha_j$ may be in the range of 1 to 100 and $\beta_j$ may be in the range of 1 to 25. FIG. 18 is a graph of speaker activations in an example embodiment. In this example, FIG. 18 shows the speaker activations 1505*b*, 1510*b*, 1515*b*, 1520*b* and 1525*b*, which comprise the optimal solution to the cost function for the same speaker positions from FIGS. 15 and 16, with the addition of the attracting force represented by $w_{ij}$. FIG. 19 is a graph of object rendering positions in an example embodiment. In this example, FIG. 19 shows the corresponding ideal object positions 1630*b* for a multitude of possible object angles and the corresponding actual rendering positions 1635*b* for those objects, connected to the ideal object positions 1630*b* by dotted lines 1640*b*. The skewed orientation of the actual rendering positions 1635*b* towards the fixed position $\vec{l}_j$ illustrates the impact of the attractor weightings on the optimal solution to the cost function.

In the second and third examples, a "repelling force" is used to "push" audio away from a position, which may be a person's position (e.g., a listener position, a talker position, etc.) or another position, such as a landmark position, a furniture position, etc. In some examples, a repelling force may be used to push audio away from an area or zone of a listening environment, such as an office area, a reading area, a bed or bedroom area (e.g., a baby's bed or bedroom), etc. According to some such examples, a particular position may be used as representative of a zone or area. For example, a position that represents a baby's bed may be an estimated position of the baby's head, an estimated sound source location corresponding to the baby, etc. The position may be referred to herein as a "repelling force position" or a "repelling location." As used herein an "repelling force" is a factor that favors relatively lower loudspeaker activation in closer proximity to the repelling force position. According to this example, we define $p_{ij}$ and $\tau_j$ with respect to a fixed repelling location $\vec{l}_j$ similarly to the attracting force in Equations 26a and 26b:

$$p_{ij} = \max_i\left\|\vec{l}_j - \vec{s}_i\right\| - \left\|\vec{l}_j - \vec{s}_i\right\| \tag{26c}$$

$$\tau_j = \max_i\left\|\vec{l}_j - \vec{s}_i\right\| \tag{26d}$$

Figure 20:
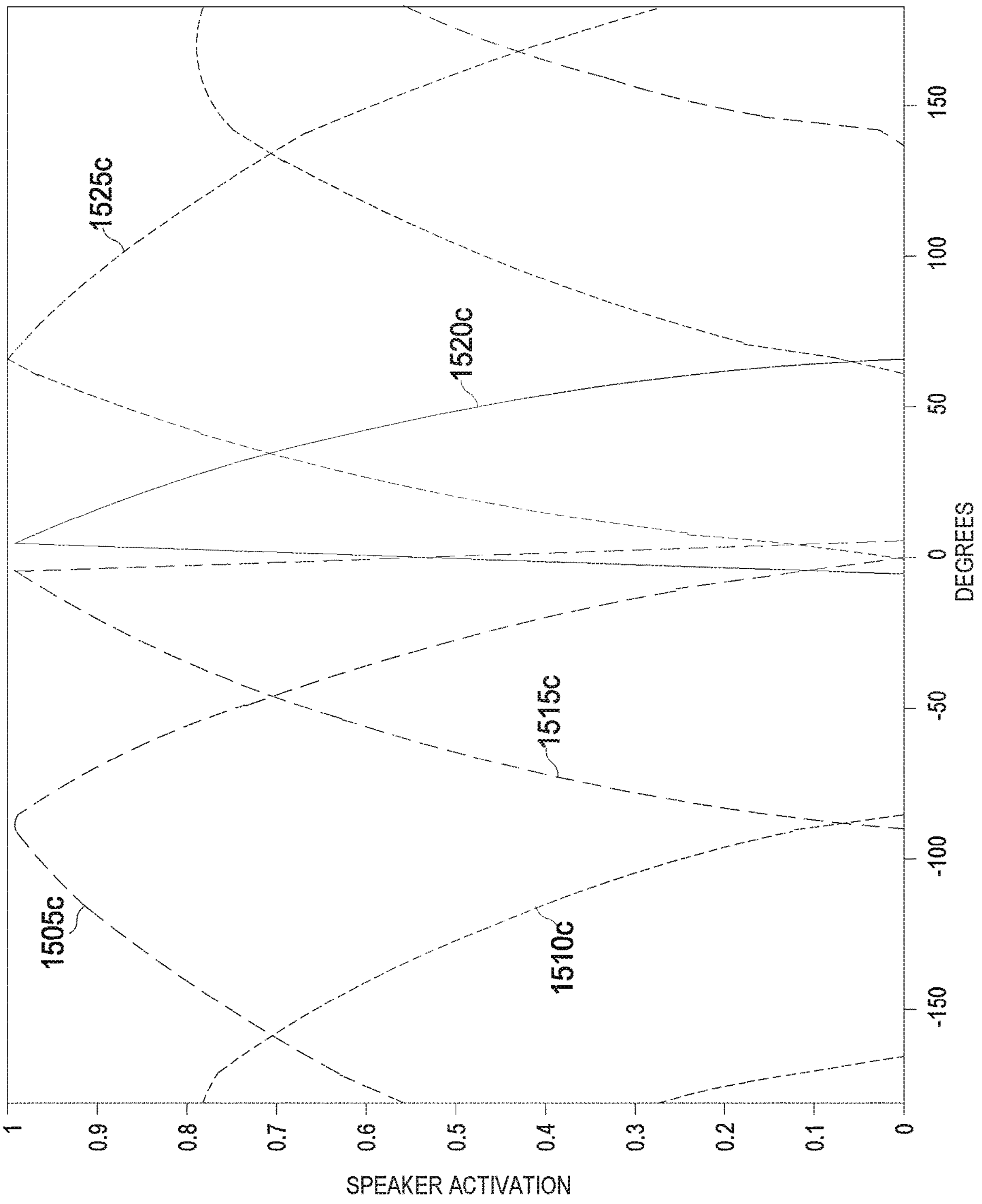
FIG. 20 is a graph of speaker activations in an example embodiment.
Figure 21:
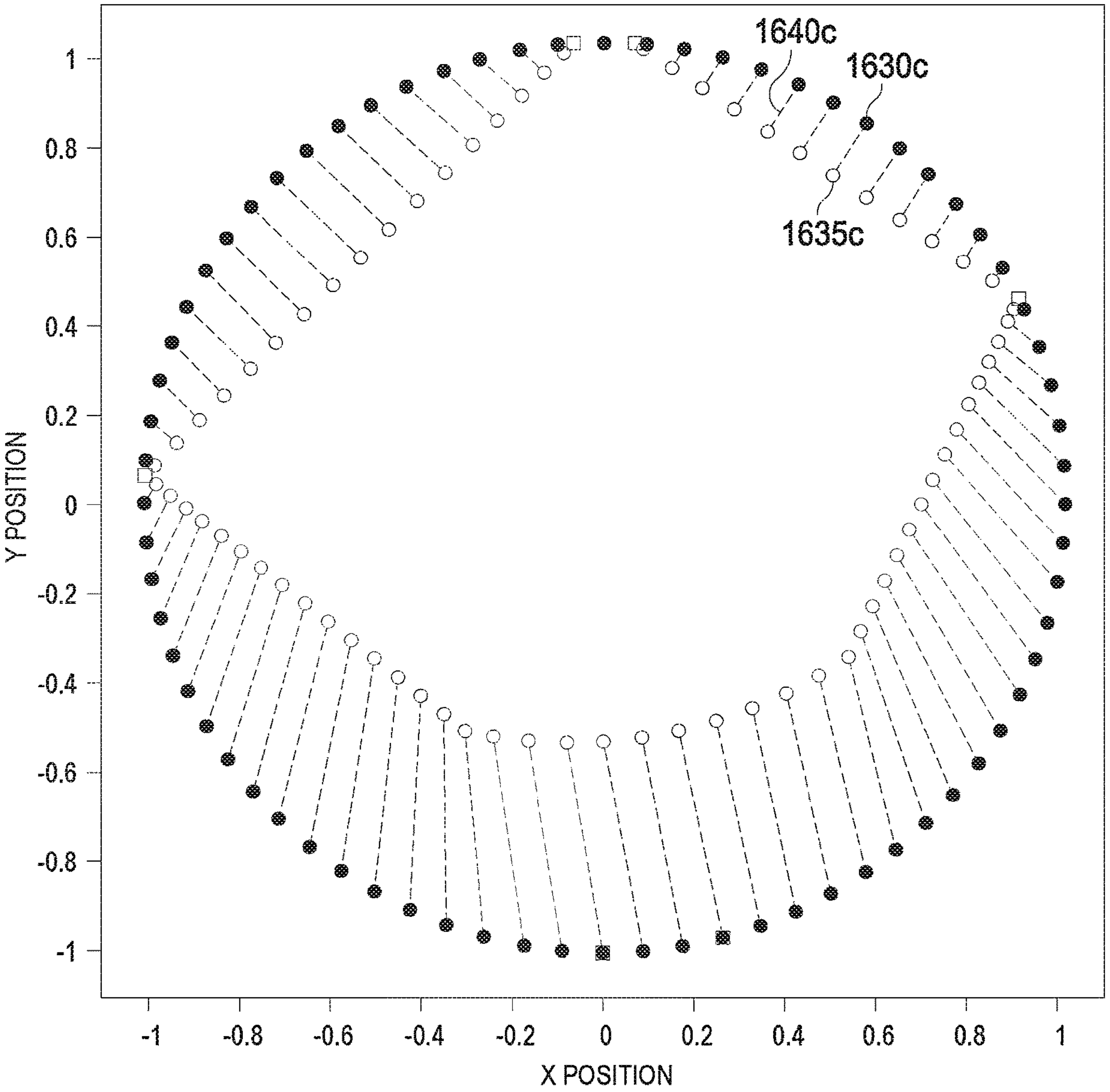
FIG. 21 is a graph of object rendering positions in an example embodiment.

To illustrate the use case of pushing audio away from a listener or talker, in one example we may specifically set $\alpha_j$=5, $\beta_j$=2, and $\vec{l}_j$ to a vector corresponding to a listener/talker position of 180 degrees (at the bottom, center of the plot). These values of $\alpha_j$, $\beta_j$, and $\vec{l}_j$ are merely examples. As noted above, in some examples $\alpha_j$ may be in the range of 1 to 100 and $\beta_j$ may be in the range of 1 to 25. FIG. 20 is a graph of speaker activations in an example embodiment. According to this example, FIG. 20 shows the speaker activations 1505*c*, 1510*c*, 1515*c*, 1520*c* and 1525*c*, which comprise the optimal solution to the cost function for the same speaker positions as previous figures, with the addition of the repelling force represented by $w_{ij}$. FIG. 21 is a graph of object rendering positions in an example embodiment. In this example, FIG. 21 shows the ideal object positions 1630*c* for a multitude of possible object angles and the corresponding actual rendering positions 1635*c* for those objects, connected to the ideal object positions 1630*c* by dotted lines 1640*c*. The skewed orientation of the actual rendering positions 1635*c* away from the fixed position $\vec{l}_j$ illustrates the impact of the repeller weightings on the optimal solution to the cost function.

Figure 22:
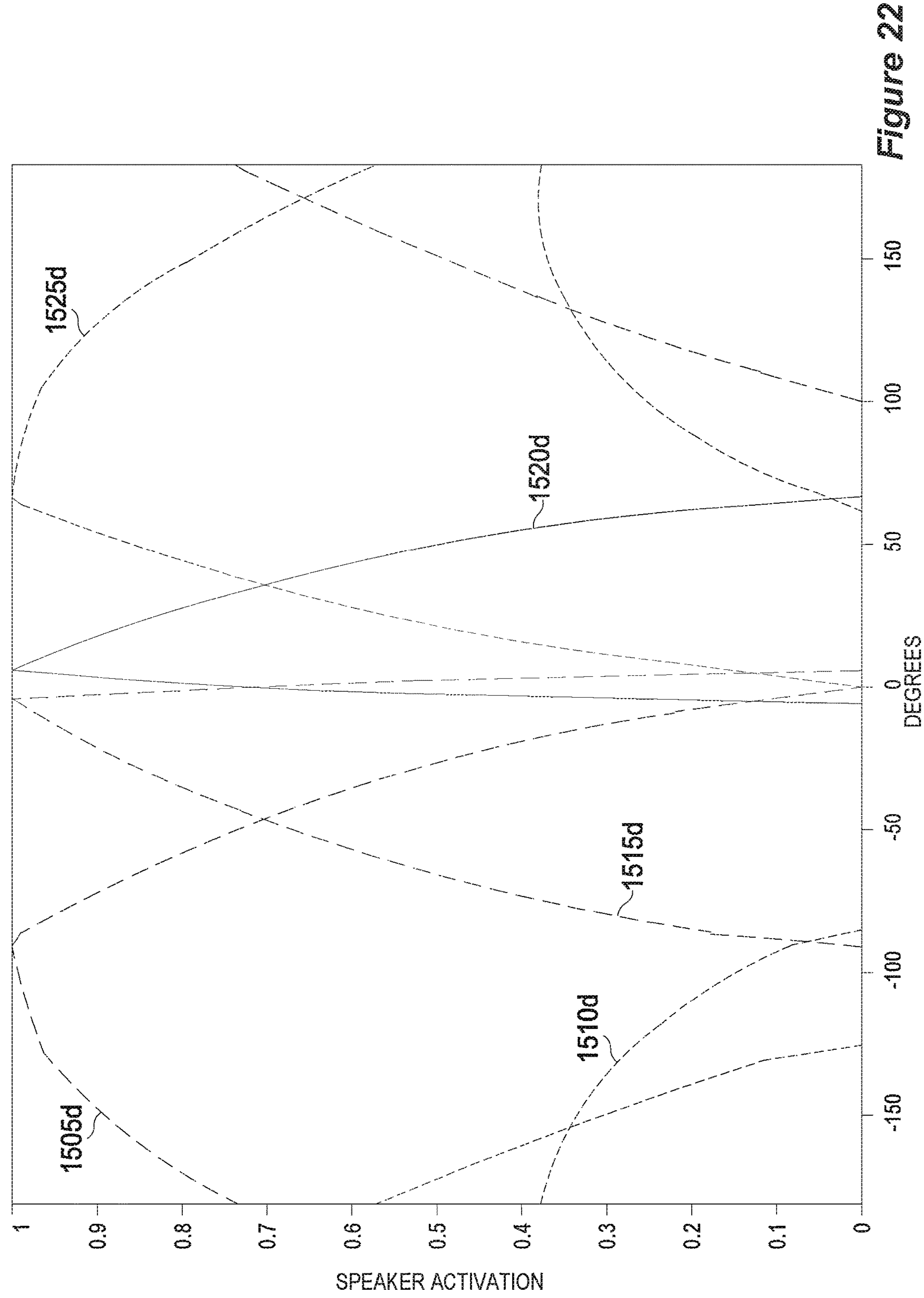
FIG. 22 is a graph of speaker activations in an example embodiment.
Figure 23:
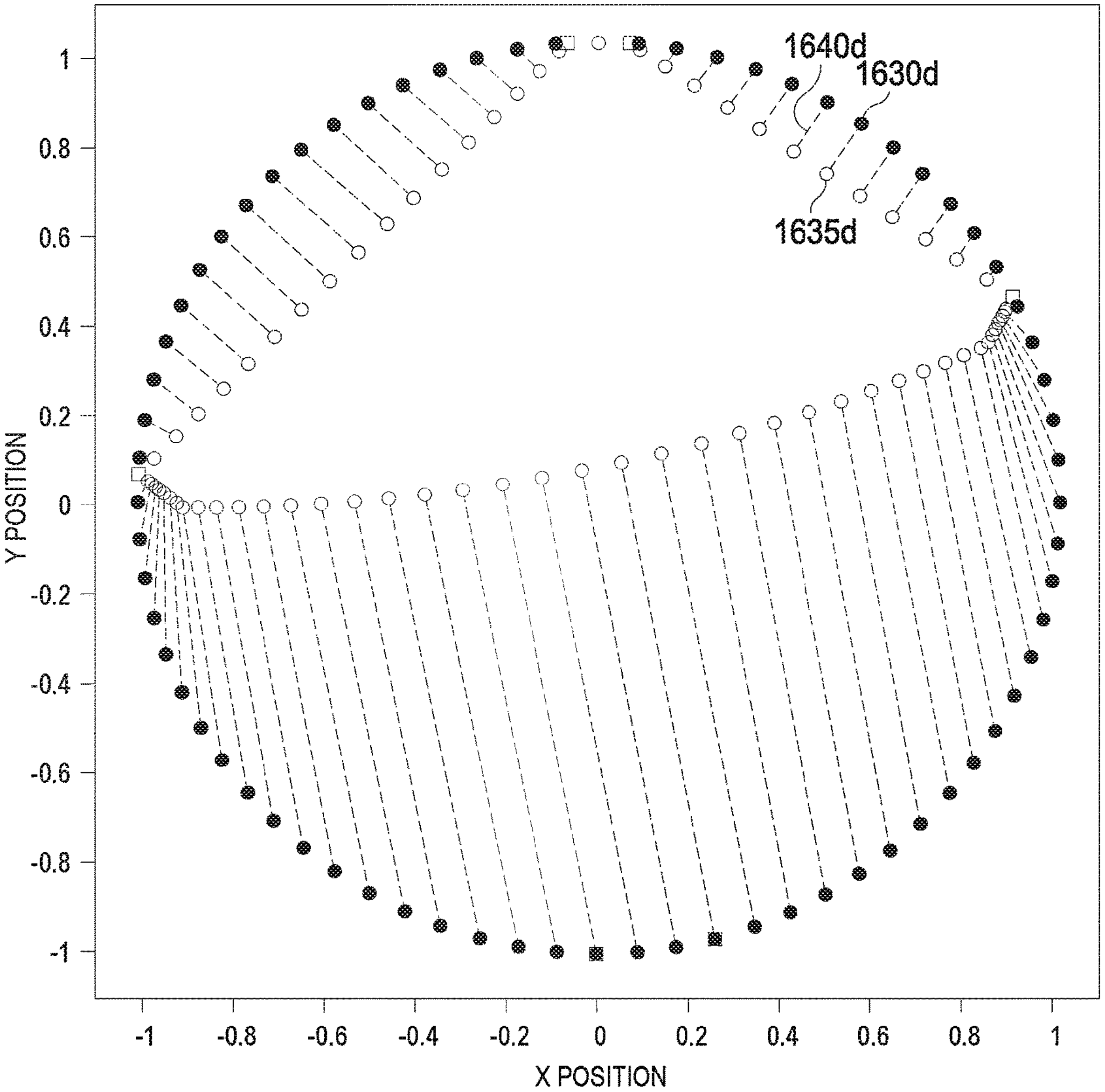
FIG. 23 is a graph of object rendering positions in an example embodiment.

The third example use case is "pushing" audio away from a landmark which is acoustically sensitive, such as a door to a sleeping baby's room. Similarly to the last example, we set $\vec{l}_j$ to a vector corresponding to a door position of 180 degrees (bottom, center of the plot). To achieve a stronger repelling force and skew the soundfield entirely into the front part of the primary listening space, we set $\alpha_j$=20, $\beta_j$=5. FIG. 22 is a graph of speaker activations in an example embodiment. Again, in this example FIG. 22 shows the speaker activations 1505*d*, 1510*d*, 1515*d*, 1520*d* and 1525*d*, which comprise the optimal solution to the same set of speaker positions with the addition of the stronger repelling force. FIG. 23 is a graph of object rendering positions in an example embodiment. And again, in this example FIG. 23 shows the ideal object positions 1630*d* for a multitude of possible object angles and the corresponding actual rendering positions 1635*d* for those objects, connected to the ideal object positions 1630*d* by dotted lines 1640*d*. The skewed orientation of the actual rendering positions 1635*d* illustrates the impact of the stronger repeller weightings on the optimal solution to the cost function.

Aspects of some disclosed implementations include a system or device configured (e.g., programmed) to perform one or more disclosed methods, and a tangible computer readable medium (e.g., a disc) which stores code for implementing one or more disclosed methods or steps thereof. For example, the system can be or include a programmable general purpose processor, digital signal processor, or microprocessor, programmed with software or firmware and/or otherwise configured to perform any of a variety of operations on data, including one or more disclosed methods or steps thereof. Such a general purpose processor may be or include a computer system including an input device, a memory, and a processing subsystem that is programmed (and/or otherwise configured) to perform one or more disclosed methods (or steps thereof) in response to data asserted thereto.

Some disclosed embodiments are implemented as a configurable (e.g., programmable) digital signal processor (DSP) that is configured (e.g., programmed and otherwise configured) to perform required processing on audio signal(s), including performance of one or more disclosed methods. Alternatively, some embodiments (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more disclosed methods or steps thereof. Alternatively, elements of some disclosed embodiments are implemented as a general purpose processor or DSP configured (e.g., programmed) to perform one or more disclosed methods or steps thereof, and the system also includes other elements (e.g., one or more loudspeakers and/or one or more microphones). A general purpose processor configured to perform one or more disclosed methods or steps thereof would typically be coupled to an input device (e.g., a mouse and/or a keyboard), a memory, and a display device.

Another aspect of some disclosed implementations is a computer readable medium (for example, a disc or other tangible storage medium) which stores code for performing (e.g., coder executable to perform) any embodiment of one or more disclosed methods or steps thereof.

While specific embodiments and applications have been described herein, it will be apparent to those of ordinary skill in the art that many variations on the embodiments and applications described herein are possible without departing from the scope of the material described and claimed herein. It should be understood that while certain implementations have been shown and described, the present disclosure is not to be limited to the specific embodiments described and shown or the specific methods described.

The invention claimed is:

1. An audio processing method, comprising:

receiving, by a control system and via an interface system, audio data, the audio data including one or more audio signals and associated spatial data, the spatial data indicating an intended perceived spatial position corresponding to an audio signal of the one or more audio signals;

receiving, by the control system and via the interface system, listener position data indicating a listener position corresponding to a person in an audio environment;

receiving, by the control system and via the interface system, loudspeaker position data indicating a position of each loudspeaker of a plurality of loudspeakers in the audio environment;

receiving, by the control system and via the interface system, loudspeaker orientation data indicating a loudspeaker orientation angle between (a) a direction of maximum acoustic radiation for each loudspeaker of the plurality of loudspeakers in the audio environment; and (b) the listener position, relative to a corresponding loudspeaker;

rendering, by the control system, the audio data for reproduction via at least a subset of the plurality of loudspeakers in the audio environment, to produce rendered audio signals, wherein the rendering is based, at least in part, on the spatial data, the listener position data, the loudspeaker position data and the loudspeaker orientation data, and wherein the rendering involves applying a loudspeaker orientation factor that reduces a relative activation of a loudspeaker based, at least in part, on an increased loudspeaker orientation angle unless offset or negated by a factor based on a position of the loudspeaker relative to a position of one or more other loudspeakers; and providing, via the interface system, the rendered audio signals to at least the subset of the loudspeakers of the plurality of loudspeakers in the audio environment.

2. The audio processing method of claim 1, further comprising estimating a loudspeaker importance metric for at least the subset of the loudspeakers, wherein the loudspeaker importance metric is the factor based on relative loudspeaker positions.

3. The audio processing method of claim 2, wherein the loudspeaker importance metric corresponds to a loudspeaker's importance for rendering an audio signal at the audio signal's intended perceived spatial position.

4. The audio processing method of claim 2, wherein the rendering for each loudspeaker is based, at least in part, on the loudspeaker importance metric.

5. The audio processing method of claim 2, wherein the rendering for each loudspeaker involves modifying an effect of the loudspeaker orientation factor based, at least in part, on the loudspeaker importance metric.

6. The audio processing method of claim 2, wherein the rendering for each loudspeaker involves reducing an effect of the loudspeaker orientation factor based, at least in part, on an increased loudspeaker importance metric.

7. The audio processing method of claim 1, wherein the loudspeaker orientation angle for a particular loudspeaker is an angle between (a) the direction of maximum acoustic radiation for the particular loudspeaker and (b) a line between a position of the particular loudspeaker and the listener position.

8. The audio processing method of claim 1, further comprising determining whether a loudspeaker orientation angle equals or exceeds a threshold loudspeaker orientation angle, wherein the audio processing method involves applying the loudspeaker orientation factor only if the loudspeaker orientation angle equals or exceeds the threshold loudspeaker orientation angle.

9. The audio processing method of claim 8, wherein the loudspeaker importance metric is based, at least in part, on a distance between an eligible loudspeaker and a line between (a) a first loudspeaker having a shortest clockwise angular distance from the eligible loudspeaker and (b) a second loudspeaker having a shortest counterclockwise angular distance from the eligible loudspeaker, an eligible loudspeaker being a loudspeaker having a loudspeaker orientation angle that equals or exceeds the threshold loudspeaker orientation angle.

10. The audio processing method of claim 9, wherein the first loudspeaker and the second loudspeaker are ineligible loudspeakers having loudspeaker orientation angles that are less than the threshold loudspeaker orientation angle.

11. The audio processing method of claim 1, wherein the rendering involves determining relative activations for at least the subset of the loudspeakers by optimizing a cost that is a function of:

a model of perceived spatial position of an audio signal of the one or more audio signals when played back over the subset of loudspeakers in the audio environment;

a measure of proximity of the intended perceived spatial position of the audio signal to a position of each loudspeaker of the subset of loudspeakers; and one or more additional dynamically configurable functions, wherein at least one of the one or more additional dynamically configurable functions is based, at least in part, on the loudspeaker orientation factor.

12. The audio processing method of claim 11, wherein at least one of the one or more additional dynamically configurable functions is based, at least in part, on the loudspeaker importance metric.

13. The audio processing method of claim 11, wherein at least one of the one or more additional dynamically configurable functions is based, at least in part, on a measurement or estimate of acoustic transmission from each loudspeaker in the audio environment to other loudspeakers in the audio environment.

14. The audio processing method of claim 1, wherein the intended perceived spatial position corresponds to at least one of a channel of a channel-based audio format or positional metadata.

15. One or more non-transitory media having software stored thereon, the software including instructions for controlling one or more devices to perform the audio processing method of claim 1.

16. An apparatus comprising:

a processor configured to:

receive audio data, the audio data including one or more audio signals and associated spatial data, the spatial data indicating an intended perceived spatial position corresponding to an audio signal of the one or more audio signals;

receive listener position data indicating a listener position corresponding to a person in an audio environment;

receive loudspeaker position data indicating a position of each loudspeaker of a plurality of loudspeakers in the audio environment;

receive loudspeaker orientation data indicating a loudspeaker orientation angle between (a) a direction of maximum acoustic radiation for each loudspeaker of the plurality of loudspeakers in the audio environment; and (b) the listener position, relative to a corresponding loudspeaker;

render the audio data for reproduction via at least a subset of the plurality of loudspeakers in the audio environment, to produce rendered audio signals, wherein the rendering is based, at least in part, on the spatial data, the listener position data, the loudspeaker position data and the loudspeaker orientation data, and wherein the rendering involves applying a loudspeaker orientation factor that reduces a relative activation of a loudspeaker based, at least in part, on an increased loudspeaker orientation angle unless offset or negated by a factor based on a position of the loudspeaker relative to a position of one or more other loudspeakers; and provide the rendered audio signals to at least the subset of the loudspeakers of the plurality of loudspeakers in the audio environment.

* * * * *